United States Patent
Im et al.

(10) Patent No.: US 11,831,887 B1
(45) Date of Patent: Nov. 28, 2023

(54) SCALABLE VIDEO CODING FOR MACHINE

(71) Applicant: DEEPX CO., LTD., Seongnam-si (KR)

(72) Inventors: IlMyeong Im, Seoul (KR); SunMi Lee, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/898,234

(22) Filed: Aug. 29, 2022

(30) Foreign Application Priority Data

Jun. 29, 2022 (KR) .................... 10-2022-0079620

(51) Int. Cl.
*H04N 19/42* (2014.01)
*H04N 19/184* (2014.01)
*H04N 19/30* (2014.01)

(52) U.S. Cl.
CPC .......... *H04N 19/42* (2014.11); *H04N 19/184* (2014.11); *H04N 19/30* (2014.11)

(58) Field of Classification Search
CPC ....... H04N 19/42; H04N 19/184; H04N 19/30
See application file for complete search history.

(56) References Cited

U.S. PATENT DOCUMENTS

| | | | | |
|---|---|---|---|---|
| 2005/0117641 A1* | 6/2005 | Xu | .......................... | H04N 19/34 |
| | | | | 375/E7.091 |
| 2006/0023748 A1* | 2/2006 | Chandhok | ............... | H04L 65/70 |
| | | | | 370/469 |
| 2020/0311870 A1* | 10/2020 | Jung | ..................... | G06T 3/4046 |
| 2022/0180476 A1* | 6/2022 | Poddar | ................. | G06V 10/462 |
| 2022/0201320 A1* | 6/2022 | Karunaratne | .......... | G06V 20/41 |

* cited by examiner

*Primary Examiner* — Jae N Noh
(74) *Attorney, Agent, or Firm* — Bridgeway IP Law Group, PLLC; Jihun Kim

(57) ABSTRACT

A neural processing unit (NPU) for decoding video or feature map is provided. The NPU may include at least one processing element (PE) for an artificial neural network, the at least one PE configured to receive and decode data included in a bitstream. The data included in the bitstream may include data of a base layer; or the data of the base layer and data of at least one enhancement layer. An NPU for encoding video or feature map is also provided. The encoder NPU may include at least one PE for an artificial neural network, the at least one PE configured to receive and encode a transmitted video or feature map, wherein the at least one PE may be further configured to output a bitstream including data of a base layer and data of at least one enhancement layer.

20 Claims, 16 Drawing Sheets

SCALABLE VIDEO CODING FOR MACHINE

CROSS-REFERENCE TO RELATED APPLICATIONS

This application claims the priority of Korean Patent Application No. 10-2022-0079620 filed on Jun. 29, 2022, in the Korean Intellectual Property Office, the disclosure of which is incorporated herein by reference.

BACKGROUND OF THE DISCLOSURE

Technical Field

The present disclosure relates to scalable video coding for a machine.

Background Art

Continuous development of the information and communication industry has led to a worldwide spread of broadcasting services having a high definition (HD) resolution. As a result, users of such services have become accustomed to high-resolution and high-definition images and/or videos, and demand has increased for high picture quality, that is, high-resolution, high-quality video such as ultra high definition (UHD) video. Standardization of coding technology for UHD (4K, 8K, or higher) video data was completed in 2013 through high efficiency video coding (HEVC).

HEVC is a next-generation video compression technology that has a higher compression rate and lower complexity than the previous H.264/AVC technology. HEVC is a key technology for effectively compressing the massive amounts of data of HD and UHD video content.

HEVC performs block-based encoding like previous compression standards. However, unlike H.264/AVC, there is a difference in that only one profile exists. There are a total of eight core encoding technologies included in HEVC's unique profile, to include technologies for hierarchical coding structure, transformation, quantization, intra prediction coding, inter picture motion prediction, entropy coding, loop filtering, and others.

Since adoption of the HEVC video codec in 2013, immersive video and virtual reality services using 4K and 8K video images have expanded, and a versatile video coding (VVC) standard has been developed. VVC, which is called H.266, is a next-generation video codec that aims to improve performance by more than two times compared to HEVC.

H.266 (VVC) was developed with the goal of more than twice the efficiency of the previous generation codec, i.e., H.265 (HEVC). VVC was initially developed with 4K or higher resolution in mind, but it was also developed for 16K-level ultra-high-resolution image processing for the purpose of responding to 360-degree images due to the expansion of the VR market. In addition, as the HDR market gradually expands due to the development of display technology, VVC supports not only 10-bit color depth but also 16-bit color depth, and supports 1000 nits, 4000 nits, and 10000 nits of brightness expression. In addition, as it is being developed with the VR market and 360-degree video market in mind, it supports variable frame rates ranging from 0 to 120 FPS.

Advancement of Artificial Intelligence

Artificial intelligence (AI) is also developing rapidly. AI refers to artificially imitating human intelligence, that is, intelligence capable of performing recognition, classification, inference, prediction, and control/decision making.

Due to the development of artificial intelligence technology and the increase in Internet of Things (IOT) devices, it is predicted that traffic between machines will explode, and image analysis that depends on the machine will be widely used.

SUMMARY OF THE DISCLOSURE

The inventors of the present disclosure have recognized the problem that a technique for image analysis by a machine has not yet been developed.

Accordingly, an object of the present disclosure is to provide a neural processing unit (NPU) for effectively performing image analysis by a machine.

A neural processing unit (NPU) according to an example of the present disclosure may be an NPU for decoding video or feature map. The NPU may include at least one processing element (PE) for an artificial neural network. A bitstream received by the at least one PE may include base layer data and may alternatively include base layer data and data of at least one enhancement layer. The base layer data included in the received bitstream may be configured to be decoded by the at least one PE. Alternatively, the base layer data and the at least one enhancement layer data included in the received bitstream may be configured to be decoded by the at least one PE.

At least a portion of the at least one enhancement layer of the received bitstream may be configured to be selectively processed.

At least a portion of the at least one enhancement layer may be configured to be selectively processed according to an available bandwidth of a transmission channel of the received bitstream.

At least a portion of the at least one enhancement layer may be configured to be selectively processed according to a preset machine analysis task.

An available bandwidth of a transmission channel of the received bitstream may be configured to be detected.

The at least one PE may be configured to selectively process at least a portion of the at least one enhancement layer according to a preset machine analysis task.

A number of the at least one enhancement layer included in one frame may be varied according to a condition of a transmission channel.

The NPU may be configured to determine a number of the at least one enhancement layer included in one frame according to a condition of a transmission channel and feedback to an encoder.

The at least one enhancement layer may be included in one frame in ascending order according to indexes of layers of the at least one enhancement layer.

An NPU according to another example of the present disclosure may be an NPU for encoding video or feature map. The NPU may include at least one processing element (PE) for an artificial neural network, the at least one PE configured to receive and encode a transmitted video or feature map. The at least one PE may be further configured to output a bitstream including data of a base layer and data of at least one enhancement layer.

A number of the at least one enhancement layer of the bitstream may be adjusted according to an available bandwidth of a transmission channel.

A number of the at least one enhancement layer of the bitstream may be adjusted for at least one frame interval.

The at least one PE may be configured to selectively process at least a portion of the plurality of enhancement layers according to a preset machine analysis task.

The at least one PE may be configured to process the base layer and a first enhancement layer according to a first machine analysis task.

The at least one PE may be configured to process the base layer, a first enhancement layer, and a second enhancement layer according to a second machine analysis task.

A number of the at least one enhancement layer included in one frame may be varied according to a condition of a transmission channel.

The NPU may be configured to receive feedback on a number of at least one enhancement layer included in one frame from the decoder.

The at least one enhancement layer may be included in one frame in ascending order according to indexes of layers of the at least one enhancement layer.

A VCM decoder according to another example of the present disclosure may be a VCM decoder for decoding video and/or feature map. The VCM decoder may include at least one processing element (PE) for an artificial neural network, the at least one PE configured to receive and decode data included in a bitstream. The data included in the bitstream may include data of a base layer; or the data of the base layer and data of at least one enhancement layer.

A VCM encoder according to another example of the present disclosure may be a VCM encoder for encoding video and/or feature map. The VCM encoder may include at least one processing element (PE) for an artificial neural network, the at least one PE configured to receive and encode a transmitted video or feature map. The at least one PE may be further configured to output a bitstream including data of a base layer and data of at least one enhancement layer.

According to the NPU of the present disclosure, it is possible to effectively perform image analysis.

DETAILED DESCRIPTION OF THE EMBODIMENT

Figure 1:
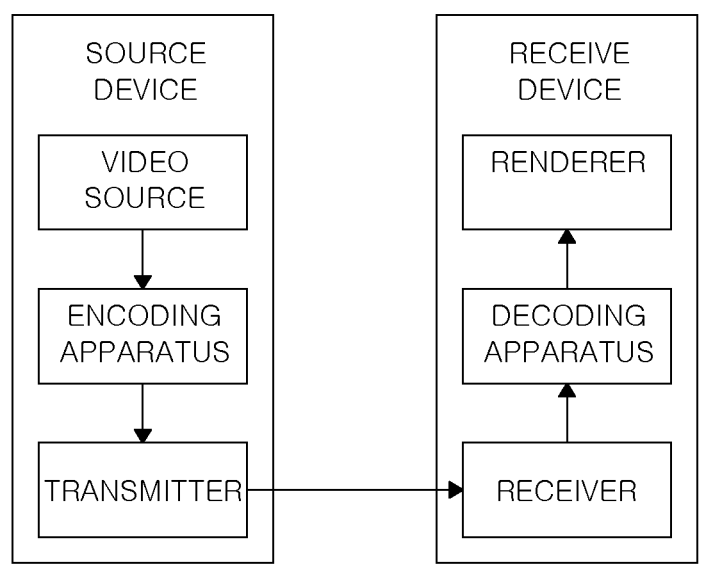
FIG. 1 is a schematic diagram of a video/image coding system.

Specific structural or step-by-step descriptions for the embodiments according to the concept of the present disclosure disclosed in the present specification or application are merely illustrative for the purpose of describing the embodiments according to the concept of the present disclosure. The examples according to the concept of the present disclosure may be carried out in various forms and are not interpreted to be limited to the examples described in the present specification or application.

Various modifications and changes may be applied to the examples in accordance with the concept of the present disclosure and the examples may have various forms so that the examples will be described in detail in the specification or the application with reference to the drawings. However, it should be understood that the examples according to the concept of the present disclosure is not limited to the specific examples, but includes all changes, equivalents, or alternatives which are included in the spirit and technical scope of the present disclosure.

Terminologies such as first and/or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween. Other expressions which describe the relationship between components, for example, "between," "adjacent to," and "directly adjacent to" should be interpreted in the same manner.

Terminologies used in the present specification are used only to describe specific examples, and are not intended to limit the present disclosure. A singular form may include a plural form if there is no clearly opposite meaning in the context. In the present specification, it should be understood that terms "include" or "have" indicate that a feature, a number, a step, an operation, a component, a part, or a combination thereof described in the specification is present, but do not exclude a possibility of presence or addition of one or more other features, numbers, steps, operations, components, parts, or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if it is not clearly defined in this specification.

When the examples are described, a technology which is well known in the technical field of the present disclosure and is not directly related to the present disclosure will not be described. The reason is that unnecessary description is omitted to clearly transmit the gist of the present disclosure without obscuring the gist.

The present disclosure relates to video/image coding. For example, the methods/examples disclosed in the present disclosure may be related to Versatile Video Coding (VVC) standard (ITU-T Rec. H.266), the next-generation video/image coding standard after VVC, or other standards related to video coding. The other standards may include High Efficiency Video Coding (HEVC) standard (ITU-T Rec. H.265), essential video coding (EVC) standard, AVS2 standard, and the like.

The present disclosure presents various embodiments related to video/image coding, and unless otherwise stated, the embodiments may be combined with each other.

In the present disclosure, a video may mean a set or series of images according to the passage of time. A picture generally means a unit representing one image in a specific time period, and a slice/tile is a unit constituting a part of a picture in coding. A slice/tile may include one or more coding tree units (CTUs). One picture may consist of one or more slices/tiles. One picture may be composed of one or more tile groups. One tile group may include one or more tiles.

A pixel or pel may mean a minimum unit constituting one picture (or image). Also, "sample" may be used as a term corresponding to a pixel. A sample may generally represent a pixel or a value of a pixel, may represent only a pixel/pixel value of a luma component, or may represent only a pixel/pixel value of a chroma component. Alternatively, the sample may mean a pixel value in the spatial domain, or when such a pixel value is transformed into the frequency domain, it may mean a transform coefficient in the frequency domain.

A unit may represent a basic unit of image processing. The unit may include at least one specific region of a picture and information related to the region. One unit may include one luma block and two chroma (e.g., Cb, Cr) blocks. A unit may be used interchangeably with terms such as a block or an area in some cases. In general, an M×N block may include samples (or sample arrays) or a set (or arrays) of transform coefficients including M columns and N rows.

Definitions of Terms

Here, in order to help the understanding of the disclosure proposed in the present specification, terminologies used in the present specification will be defined in brief.

NPU is an abbreviation for a neural processing unit and refers to a processor specialized for an operation of an artificial neural network model separately from the central processor (CPU).

AI accelerator: As an AI computation accelerator, it may refer to an NPU.

ANN is an abbreviation for an artificial neural network and refers to a network which connects nodes in a layered structure by imitating the connection of the neurons in the human brain through a synapse to imitate the human intelligence.

Information about a structure of an artificial neural network: Information including information on the number of layers, the number of nodes in a layer, a value of each node, information on an operation processing method, information on a weight matrix applied to each node, and the like.

Information on data locality of artificial neural network: Information that allows the neural processing unit to predict the operation order of the artificial neural network model processed by the neural processing unit based on the data access request order requested to a separate memory.

DNN: An abbreviation for a deep neural network and may mean that the number of hidden layers of the artificial neural network is increased to implement higher artificial intelligence.

CNN: An abbreviation for a convolutional neural network and is a neural network which functions similar to the image processing performed in a visual cortex of the human brain. The convolutional neural network is known to be appropriate for image processing and is known to be easy to extract features of input data and identify the pattern of the features.

Kernel means a weight matrix which is applied to the CNN. The value of the kernel can be determined through machine learning.

Hereinafter, the present disclosure will be described in detail by explaining examples of the present disclosure with reference to the accompanying drawings.

FIG. 1 schematically shows an example of a video/image coding system.

Referring to FIG. 1, a video/image coding system may include a source device and a receive device. The source device may transmit encoded video/image information or data in the form of a file or streaming to the receive device through a digital storage medium or a network.

The source device may include a video source, an encoding apparatus, and a transmitter. The receive device may include a receiver, a decoding apparatus, and a renderer. The encoding apparatus may be referred to as a video/image encoder, and the decoding apparatus may be referred to as a video/image decoder. The transmitter may be included in the encoding apparatus. The receiver may be included in the decoding apparatus. The renderer may include a display unit, and the display unit may be configured as a separate device or external component.

The video source may acquire a video/image through a process of capturing, synthesizing, or generating a video/image. A video source may include a video/image capture device and/or a video/image generating device. A video/image capture device may include, for example, one or more cameras, a video/image archive containing previously captured video/images, and the like. A video/image generating device may include, for example, a computer, tablet, or smartphone, and may (electronically) generate a video/image. For example, a virtual video/image may be generated through a computer, and the like. In this case, the video/image capturing process may be substituted for the process of generating related data.

The encoding apparatus may encode the input video/image. The encoding apparatus may perform a series of procedures such as prediction, transformation, and quantization for compression and coding efficiency. The encoded data (encoded video/image information) may be output in the form of a bitstream.

The transmitter may transmit encoded video/image information or data output in the form of a bitstream to the receiver of the receive device in the form of a file or streaming through a digital storage medium or a network. The digital storage medium may include various storage media such as a flash drive, SD card, CD, DVD, Blu-ray disc, HDD, SSD, or the like. The transmitter may include an element for generating a media file through a predetermined file format, and may include an element for transmission through a broadcast/communication network. The receiver may receive/extract the bitstream and transmit it to the decoding apparatus.

The decoding apparatus may decode the video/image by performing a series of procedures such as inverse quantization, inverse transformation, and prediction corresponding to the operation of the encoding apparatus.

The renderer may render the decoded video/image. The rendered video/image may be displayed through the display unit.

Figure 2:
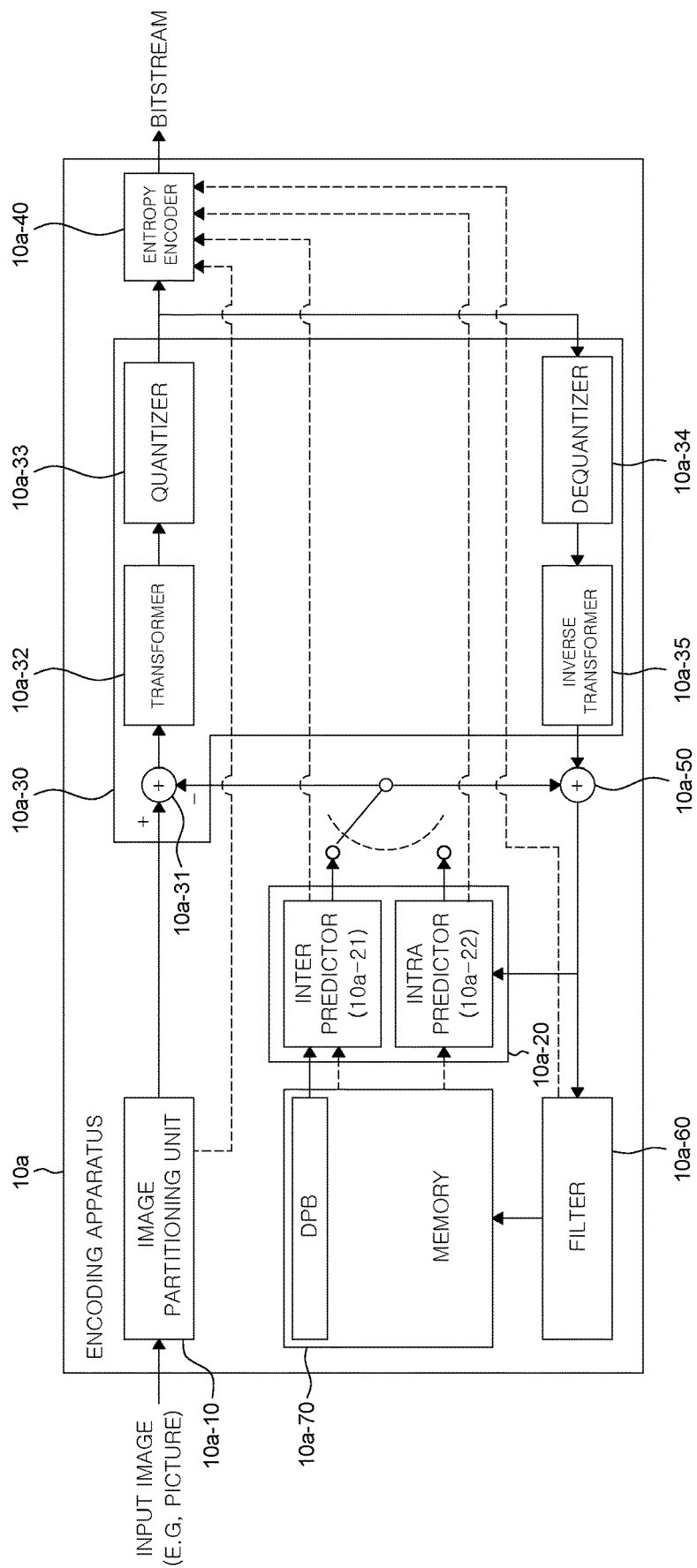
FIG. 2 is a schematic diagram of a video/image encoder.

FIG. 2 illustrates a configuration of a video/image encoder.

Hereinafter, a video encoding apparatus may include an image encoding apparatus.

Referring to FIG. 2, the encoding apparatus 10a may be configured to include an image partitioning unit 10a-10, a predictor 10a-20, a residual processor 10a-30, an entropy encoder 10a-40, an adder 10a-50, a filter 10a-60, and a memory 10a-70. The predictor 10a-20 may include an inter predictor 10a-21 and an intra predictor 10a-22. The residual processor 10a-30 may include a transformer 10a-32, a quantizer 10a-33, an dequantizer 10a-34, and an inverse transformer 10a-35. The residual processor 10a-30 may further include a subtractor 10a-31. The adder 10a-50 may be referred to as a reconstructor or a reconstructed block generator. The above-described image partitioning unit 10a-10, predictor 10a-20, residual processor 10a-30, entropy encoder 10a-40, adder 10a-50, and filter 10a-60 may be configured by one or more hardware components (e.g., encoder chipset or processor) according to an embodiment. In addition, the memory 10a-70 may include a decoded picture buffer (DPB), and may be configured by a digital storage medium. The hardware component of the memory 10a-70 may be configured as an internal or external component.

The image partitioning unit 10a-10 may divide an input image (or a picture, a frame) input to the encoding apparatus 10a into one or more processors. As an example, the processor may be referred to as a coding unit (CU). In this case, the coding unit may be divided recursively according to a quad-tree binary-tree ternary-tree (QTBTTT) structure from a coding tree unit (CTU) or largest coding unit (LCU). For example, one coding unit may be divided into a plurality of coding units having a lower depth based on a quad tree structure, a binary tree structure, and/or a ternary structure. In this case, for example, a quad tree structure may be applied first and a binary tree structure and/or a ternary structure may be applied later. Alternatively, the binary tree structure may be applied first. A coding procedure according to the present disclosure may be performed based on the final coding unit that is no longer divided. In this case, the maximum coding unit may be directly used as the final coding unit based on coding efficiency according to image characteristics. Alternatively, if necessary, the coding unit may be recursively divided into coding units of a lower depth, so that a coding unit having an optimal size may be used as a final coding unit. Here, the coding procedure may include procedures such as prediction, transformation, and restoration, which will be described later. As another example, the processor may further include a predictor (PU) or a transformer (TU). In this case, the predictor and the transformer may be divided or partitioned from the above-described final coding unit, respectively. The predictor may be a unit of sample prediction, and the transformer may be a unit for deriving a transform coefficient and/or a unit for deriving a residual signal from the transform coefficient.

A unit may be used interchangeably with terms such as a block or an area in some cases. In general, an M×N block may represent a set of samples or transform coefficients including M columns and N rows. A sample may generally represent a pixel or a value of a pixel, may represent only a pixel/pixel value of a luma component, or may represent only a pixel/pixel value of a chroma component. A sample may be used as a term corresponding to a picture (or image) as a pixel or a pel.

The subtractor 10a-31 may generate a residual signal (a residual block, residual samples, or a residual sample array) by subtracting a predicted signal (a predicted block, predicted samples, or a predicted sample array) output from a predictor 10a-20 from an input video signal (an original block, original samples, or an original sample array), and the generated residual signal is transmitted to the transformer 10a-32. A predictor 10a-20 can perform prediction on a processing target block (hereinafter referred to as a current block) and generate a predicted block including predicted samples with respect to the current block. The predictor 10a-20 can determine whether intra-prediction or inter-prediction is applied to the current block or coding unit (CU). The predictor can generate various types of information about prediction, such as prediction mode information, and transmit the information to an entropy encoder 10a-40. Information about prediction can be encoded in the entropy encoder 10a-40 and output in the form of a bitstream.

The intra predictor 10a-22 can predict a current block with reference to samples in a current picture. Referred samples may neighbor the current block or may be separated therefrom according to a prediction mode. In intra-prediction, prediction modes may include a plurality of nondirectional modes and a plurality of directional modes. The nondirectional modes may include a DC mode and a planar mode, for example. The directional modes may include, for example, 33 directional prediction modes or 65 directional prediction modes according to a degree of minuteness of prediction direction. However, this is an example, and a higher or lower number of directional prediction modes may be used depending on the setting. The intra predictor 10a-22 may determine a prediction mode to be applied to the current block using a prediction mode applied to neighbor blocks.

The inter predictor 10a-21 can derive a predicted block with respect to the current block on the basis of a reference block (reference sample array) specified by a motion vector on a reference picture. Here, to reduce the quantity of motion information transmitted in an inter-prediction mode, motion information can be predicted in units of blocks, subblocks, or sample on the basis of correlation of motion information between a neighboring block and the current block. The motion information may include a motion vector and a reference picture index. The motion information may further include inter-prediction direction (L0 prediction, L1 prediction, Bi prediction, etc.) information. In the case of inter-prediction, neighboring blocks may include a spatial neighboring block present in a current picture and a temporal neighboring block present in a reference picture. The reference picture including the reference block may be the same as or different from the reference picture including the temporal neighboring block. The temporal neighboring block may be called a collocated reference block or a collocated CU (colCU) and the reference picture including the temporal neighboring block may be called a collocated picture (colPic). For example, the inter predictor 10a-21 may form a motion information candidate list on the basis of neighboring blocks and generate information indicating which candidate is used to derive a motion vector and/or a reference picture index of the current block. Inter-prediction can be performed on the basis of various prediction modes, and in the case of a skip mode and a merge mode, the inter predictor 10a-21 can use motion information of a neighboring block as motion information of the current block. In the case of the skip mode, a residual signal may not be transmitted differently from the merge mode. In the case of a motion vector prediction (MVP) mode, the motion vector of the current block can be indicated by using a motion vector of a neighboring block as a motion vector predictor and signaling a motion vector difference.

The predictor 10a-20 may generate a prediction signal based on various prediction methods to be described later. For example, the predictor may apply intra prediction or inter prediction to predict one block, and may simultaneously apply intra prediction and inter prediction. This can be called combined inter and intra prediction (CIIP). In addition, the predictor may perform intra block copy (IBC) to predict the block. IBC may be used for video/video coding of content such as a game, for example, screen content coding (SCC). IBC basically performs prediction within the current picture, but may be performed similarly to inter prediction in that a reference block is derived within the current picture. That is, IBC may use at least one of the inter prediction techniques described in the present disclosure.

A predicted signal generated through the inter predictor 10a-21 or the intra predictor 10a-22 can be used to generate a reconstructed signal or a residual signal. The transformer 10a-32 can generate transform coefficients by applying a transform technique to a residual signal. For example, the transform technique may include at least one of DCT (Discrete Cosine Transform), DST (Discrete Sine Transform), GBT (Graph-Based Transform), and CNT (Conditionally Non-linear Transform). Here, GBT refers to transform obtained from a graph representing information on relationship between pixels. CNT refers to transform obtained on the basis of a predicted signal generated using all previously reconstructed pixels. Further, the transform process may be applied to square pixel blocks having the same size or applied to non-square blocks having variable sizes.

A quantizer 10a-33 may quantize transform coefficients and transmit the quantized transform coefficients to the entropy encoding unit 10a-40, and the entropy encoding unit 10a-40 may encode a quantized signal (information about the quantized transform coefficients) and output the encoded signal as a bitstream. The information about the quantized transform coefficients may be called residual information. The quantizer 10a-33 may rearrange the quantized transform coefficients in the form of a block into the form of a one-dimensional vector on the basis of a coefficient scan order and may generate information about the quantized transform coefficients on the basis of the quantized transform coefficients in the form of a one-dimensional vector. The entropy encoding unit 10a-40 can execute various encoding methods such as exponential Golomb, context-adaptive variable length coding (CAVLC) and context-adaptive binary arithmetic coding (CABAC), for example.

The entropy encoding unit 10a-40 may encode information necessary for video/image reconstruction (e.g., values of syntax elements and the like) along with or separately from the quantized transform coefficients. Encoded information (e.g., video/image information) may be transmitted or stored in the form of a bitstream in network abstraction layer (NAL) unit. The video/image information may further include information about various parameter sets, such as an adaptation parameter set (APS), a picture parameter set (PPS), a sequence parameter set (SPS), or a video parameter set (VPS). In addition, the video/image information may further include general constraint information. Signaling/transmitted information and/or syntax elements described later in the present disclosure may be encoded through the above-described encoding procedure and included in the bitstream. The bitstream may be transmitted through a network or stored in a digital storage medium. Here, the network may include a broadcast network and/or a communication network and the digital storage medium may include various storage media such as a flash drive, SD card, CD, DVD, Blue-ray disc, HDD, or SSD. A transmitter (not shown) which transmits the signal output from the entropy encoding unit 10a-40 and/or a storage (not shown) which stores the signal may be configured as internal/external elements of the encoding apparatus 10a, and the transmitter may be included in the entropy encoding unit 10a-40.

The quantized transform coefficients output from the quantizer 10a-33 can be used to generate a predicted signal. For example, a residual signal can be reconstructed by applying inverse quantization and inverse transform to the quantized transform coefficients through an dequantizer 10a-34 and an inverse transformer 10a-35 in the loop. An adder 10a-50 can add the reconstructed residual signal to the predicted signal output from the inter predictor 10a-21 or the intra predictor 10a-22 such that a reconstructed signal (reconstructed picture, reconstructed block, or reconstructed sample array) can be generated. When there is no residual with respect to a processing target block as in a case in which the skip mode is applied, a predicted block can be used as a reconstructed block. The adder 10a-50 may also be called a reconstruction unit or a reconstructed block generator. The generated reconstructed signal can be used for intra-prediction of the next processing target block in the current picture or used for inter-prediction of the next picture through filtering which will be described later.

Meanwhile, luma mapping with chroma scaling (LMCS) may be applied during picture encoding and/or restoration.

The filter 10a-60 may improve subjective/objective image quality by applying filtering to the reconstructed signal. For example, the filter 10a-60 may generate a modified reconstructed picture by applying various filtering methods to the reconstructed picture, and store the modified reconstructed picture into the memory 10a-70, specifically the memory 10a-70 can be stored in the DPB. The various filtering methods may include, for example, deblocking filtering, sample adaptive offset (SAO), an adaptive loop filter, a bilateral filter, and the like. The filter 10a-60 may generate various kinds of filtering-related information and transmit it to the entropy encoding unit 10a-90, as will be described later in the description of each filtering method. The filtering-related information may be encoded by the entropy encoding unit 10a-90 and outputted in the form of a bitstream.

The modified reconstructed picture transmitted to the memory 10a-70 may be used as a reference picture in the inter predictor 10a-80. Through this, when inter prediction is applied, the encoding apparatus can avoid prediction mismatch between the encoding apparatus 10a and the decoding apparatus, and can also improve encoding efficiency.

The DPB of the memory 10a-70 may store the modified reconstructed picture to be used as a reference picture in the inter predictor 10a-21. The memory 10a-70 may store motion information of a block from which motion information in the current picture is derived (or encoded) and/or motion information of blocks in an already reconstructed picture. The stored motion information may be transmitted to the inter predictors 10a-21 to be used as motion information of a spatial neighboring block or motion information of a temporal neighboring block. The memories 10a-70 may store reconstructed samples of blocks reconstructed in the current picture, and may transmit the reconstructed samples to the intra predictors 10*a*-22.

Figure 3:
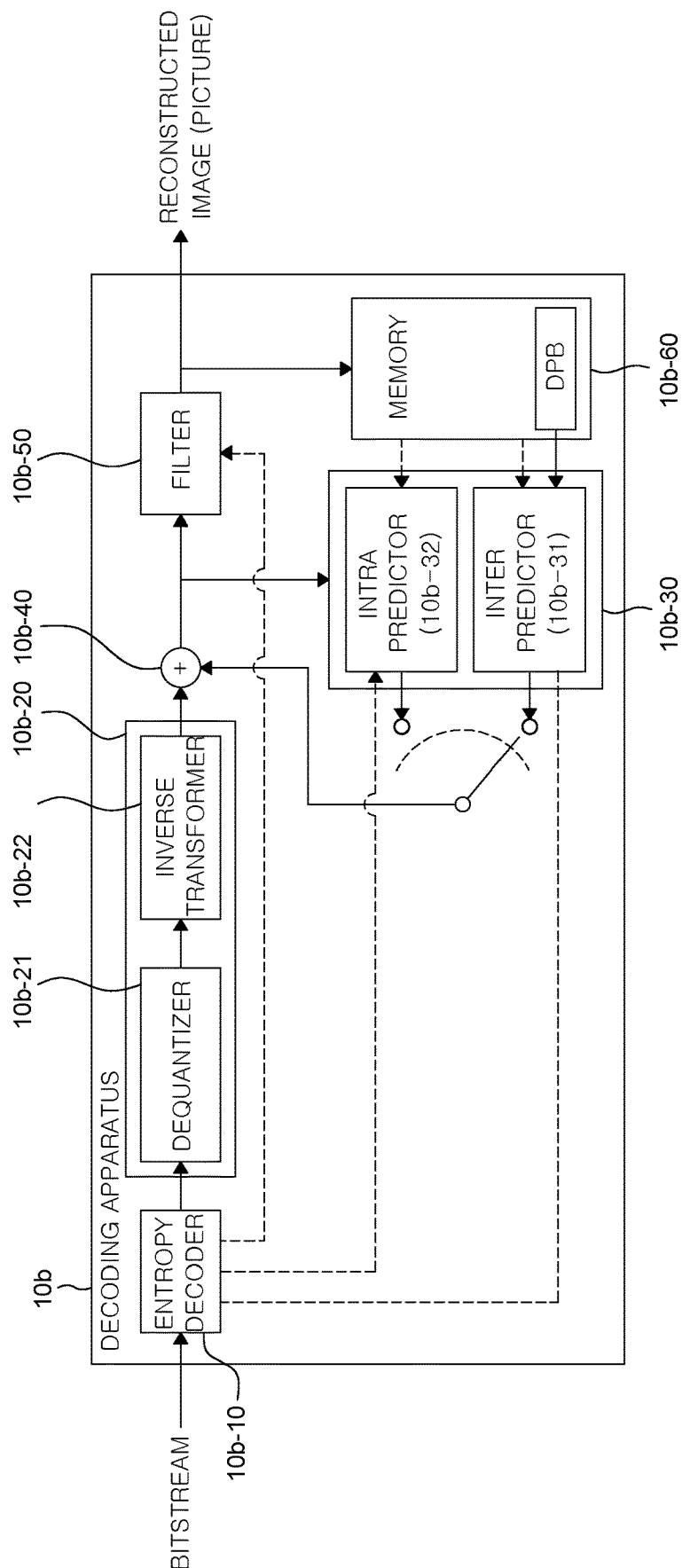
FIG. 3 is a schematic diagram of a video/image decoder.

FIG. 3 illustrates a configuration of a video/image decoder.

Referring to FIG. 3, the decoding apparatus 10*b* may be configured to include an entropy decoder 10*b*-10, a residual processor 10*b*-20, a predictor 10*b*-30, and an adder 10*b*-40, a filter 10*b*-50, and a memory 10*b*-60. The predictor 10*b*-30 may include an inter predictor 10*b*-31 and an intra predictor 10*b*-32. The residual processor 10*b*-20 may include a dequantizer 10*b*-21 and an inverse transformer 10*b*-22. The entropy decoder 10*b*-10, the residual processor 10*b*-20, the predictor 10*b*-30, the adder 10*b*-40, and the filter 10*b*-50 may be configured by one hardware component (e.g., a decoder chipset or a processor) according to an example. In addition, the memory 10*b*-60 may include a decoded picture buffer (DPB), and may be configured by a digital storage medium. The hardware component of the memory 10*b*-60 may be configured as an internal or external component.

When a bitstream including video/image information is input, the decoding apparatus 10*b* may reconstruct an image corresponding to a process in which the video/image information is processed in the encoding apparatus 10*a* of FIG. 2. For example, the decoding apparatus 10*b* may derive units/blocks based on block division related information obtained from the bitstream. The decoding apparatus 10*b* may perform decoding by using a processing unit applied in the encoding apparatus. Thus, the processing unit of decoding may be, for example, a coding unit, and the coding unit may be divided according to a quad tree structure, a binary tree structure, and/or a ternary tree structure from a coding tree unit or a largest coding unit. One or more transformers may be derived from a coding unit. In addition, the reconstructed image signal decoded and output through the decoding apparatus 10*b* may be reproduced through the playback device.

The decoding apparatus 10*b* may receive a signal output from the encoding apparatus 10*a* of FIG. 2 in the form of a bitstream, and the received signal may be decoded through the entropy decoder 10*b*-10. For example, the entropy decoder 10*b*-10 may parse the bitstream to derive information (e.g., video/image information) required for image restoration (or picture restoration). The video/image information may further include information about various parameter sets, such as an adaptation parameter set (APS), a picture parameter set (PPS), a sequence parameter set (SPS), or a video parameter set (VPS). In addition, the video/image information may further include general constraint information.

The decoding apparatus may decode the picture further based on the information on the parameter set and/or the general restriction information. Signaling/received information and/or syntax elements, described later in the present disclosure, may be decoded through the decoding procedure and obtained from the bitstream. For example, the entropy decoder 10*b*-10 may decode information in the bitstream on the basis of a coding method such as exponential Golomb, CAVLC, or CABAC and may output syntax element values necessary for image reconstruction and quantized values of transform coefficients with respect to residual. More specifically, the CABAC entropy decoding method receives a bin corresponding to each syntax element in the bitstream, determines a context model using decoding target syntax element information and decoding information of neighboring and decoding target blocks or information on symbols/bins decoded in a previous stage, predicts bin generation probability according to the determined context model and performs arithmetic decoding of bins to generate a symbol corresponding to each syntax element value. In this case, the CABAC entropy decoding method may update the context model by using the decoded symbol/bin information for the context model of the next symbol/bin after determining the context model. Information about prediction among the information decoded by the entropy decoder 10*b*-10 is provided to the predictor 10*b*-30, and information about the residual on which entropy decoding is provided by the entropy decoder 10*b*-10. That is, the quantized transform coefficients and related parameter information may be input to the dequantizer 10*b*-21.

Also, information on filtering among the information decoded by the entropy decoder 10*b*-10 may be provided to the filter 10*b*-50. On the other hand, a receiver (not shown) that receives a signal output from the encoding apparatus may be further configured as an internal/external element of the decoding apparatus 10*b*, or the receiver may be a component of the entropy decoder 10*b*-10. On the other hand, the decoding apparatus according to the present disclosure may be referred to as a video/image/picture decoding apparatus, and the decoding apparatus may be divided into an information decoder (video/image/picture information decoder) and a sample decoder (video/image/picture sample decoder). The information decoder may include the entropy decoder 10*b*-10, and the sample decoder may include at least one of the dequantizer 10*b*-21, the inverse transformer 10*b*-22, the predictor 10*b*-30, the adder 10*b*-40, the filter 10*b*-50, and the memory 10*b*-60.

The dequantizer 10*b*-21 may inverse quantize the quantized transform coefficients to output the transform coefficients. The dequantizer 10*b*-21 may rearrange the quantized transform coefficients in a two-dimensional block form. In this case, the rearrangement may be performed based on the coefficient scan order performed by the encoding device. The dequantizer 10*b*-21 may perform inverse quantization on the quantized transform coefficients using a quantization parameter (e.g., quantization step size information) and obtain transform coefficients. The dequantizer 10*b*-21 may perform inverse quantization on the quantized transform coefficients using a quantization parameter (e.g., quantization step size information) and obtain transform coefficients.

The inverse transformer 10*b*-22 inverse transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the prediction information output from the entropy decoder 10*b*-10, and may determine a specific intra/inter prediction mode.

The predictor may generate a prediction signal based on various prediction methods to be described later. For example, the predictor may apply intra prediction or inter prediction to predict one block, and may simultaneously apply intra prediction and inter prediction. This can be referred to as combined inter and intra prediction (CIIP). In addition, the predictor may perform intra block copy (IBC) to predict the block. IBC may be used for video/video coding of content such as a game, for example, screen content coding (SCC). IBC basically performs prediction within the current picture, but may be performed similarly to inter prediction in that a reference block is derived within the current picture. That is, IBC may use at least one of the inter prediction techniques described in the present disclosure.

The intra predictor 10b-32 may predict the current block with reference to samples in the current picture. The referenced samples may be located in the vicinity of the current block or may be located apart from each other according to the prediction mode. In intra prediction, prediction modes may include a plurality of non-directional modes and a plurality of directional modes. The intra predictor 10b-32 may determine the prediction mode applied to the current block by using the prediction mode applied to the neighboring block.

The inter predictor 10b-31 may derive the predicted block for the current block based on the reference block (reference sample array) specified by the motion vector on the reference picture. In this case, in order to reduce the amount of motion information transmitted in the inter prediction mode, the motion information may be predicted in units of blocks, subblocks, or samples based on the correlation between motion information between neighboring blocks and the current block. The motion information may include a motion vector and a reference picture index. The motion information may further include inter prediction direction (L0 prediction, L1 prediction, Bi prediction, and the like) information.

In the case of inter prediction, the neighboring blocks may include spatial neighboring blocks existing in the current picture and temporal neighboring blocks present in the reference picture. For example, the inter predictor 10b-31 may construct a motion information candidate list based on neighboring blocks, and derive a motion vector and/or a reference picture index of the current block based on the received candidate selection information. Inter prediction may be performed based on various prediction modes, and the information on the prediction may include information indicating the mode of inter prediction for the current block.

The adder 10b-40 may generate a reconstructed signal (reconstructed picture, reconstructed block, or reconstructed sample array) by adding the obtained residual signal to the predicted signal (predicted block or predicted sample array) output from the predictor 10b-30. When there is no residual with respect to the processing target block as in a case in which the skip mode is applied, the predicted block may be used as a reconstructed block.

The adder 10b-40 may be referred to as a restoration unit or a restoration block generation unit. The generated reconstructed signal may be used for intra prediction of the next processing object block in the current picture, may be output through filtering as described below, or may be used for inter prediction of the next picture.

Meanwhile, luma mapping with chroma scaling (LMCS) may be applied in the picture decoding process.

The filter 10b-50 can improve subjective/objective picture quality by applying filtering to the reconstructed signal. For example, the filter 10b-50 can generate a modified reconstructed picture by applying various filtering methods to the reconstructed picture and transmit the modified reconstructed picture to a memory 60, specifically to the DPB. The various filtering methods may include, for example, deblocking filtering, sample adaptive offset, adaptive loop filter, and bilateral filter.

The (modified) reconstructed picture stored in the DPB of the memory 10b-60 may be used as a reference picture in the inter predictor 10b-31. The memory 10b-60 may store motion information of a block in which motion information in the current picture is derived (or decoded) and/or motion information of blocks in an already reconstructed picture. The stored motion information may be transmitted to the inter predictor 10b-31 to be used as motion information of a spatial neighboring block or motion information of a temporal neighboring block. The memory 10b-60 may store reconstructed samples of blocks reconstructed in the current picture, and may transmit the reconstructed samples to the intra predictor 10b-32.

In the present disclosure, examples described in the predictor 10b-30, the dequantizer 10b-21, the inverse transformer 10b-22, and the filter 10b-50 of the decoding apparatus 10b may be applied to be the same or corresponding to the predictor 10a-20, the dequantizer 10a-34, the inverse transformer 10a-35, and the filter 10a-60 of the encoding apparatus 10a, respectively.

As described above, in video coding, prediction is performed to increase compression efficiency. Through this, it is possible to generate a predicted block including prediction samples for the current block, which is a block to be coded. Here, the predicted block includes prediction samples in a spatial domain (or pixel domain). The predicted block is derived identically in the encoding device and the decoding apparatus. The encoding apparatus may increase image coding efficiency by signaling, to the decoding apparatus, information (residual information) about the residual between the original block and the predicted block, rather than the original sample value of the original block itself. The decoding apparatus may derive a residual block including residual samples based on the residual information, may generate a reconstructed block including reconstructed samples by adding the residual block and the predicted block, and may generate a reconstructed picture including the reconstructed blocks.

The residual information may be generated through transformation and quantization procedures. For example, the encoding apparatus derives a residual block between the original block and the predicted block, and performs a transform procedure on residual samples (residual sample array) included in the residual block to derive transform coefficients, and by performing a quantization procedure on the transform coefficients to derive quantized transform coefficients, the associated residual information may be signaled to the decoding apparatus (via a bitstream). Here, the residual information may include value information of the quantized transform coefficients, location information, a transform technique, a transform kernel, and information such as a quantization parameter. The decoding apparatus may perform an inverse quantization/inverse transformation procedure based on the residual information and derive residual samples (or residual blocks). The decoding apparatus may generate a reconstructed picture based on the predicted block and the residual block. The encoding apparatus may also inverse quantize/inverse transform the quantized transform coefficients for reference for inter prediction of a later picture to derive a residual block, and generate a reconstructed picture based thereon.

Scalable Video Coding

Scalable video coding (SVC) refers to a complex bitstream video that includes several types of images in one bitstream, and may provide video services in various networks and heterogeneous terminal environments by compressing several types of images into one complex bitstream.

SVC may be transformed into scalable feature coding (SFC) for a machine task. The SFC may generate a complex bitstream feature map including several types of feature maps in one bitstream. As described above, by compressing various types of feature maps into one complex bit stream, a machine analysis service can be provided in various networks and heterogeneous terminal environments.

SFC is a technology that allows a decoding apparatus to selectively decode a part of a bitstream. The encoded bitstream may include a base layer and at least one enhancement layer. The base layer and at least one enhancement layer may be arranged in a specific order within the encoded bitstream.

However, the present disclosure is not limited to the enhancement layer, and the enhancement layer may be referred to as various layers such as an extension layer, an additional layer, and a lower layer.

SVC or SFC includes various scalable encoding modes. For example, a mode for spatial scalability provides layers of spatial resolution, and a mode for temporal scalability provides layers of frame rate. In addition, quality scalability, complexity scalability, and the like provide a layer for the visual quality of an image or a feature quality of a feature map and a layer for the complexity of the decoding method.

In the mode for spatial scalability, the base layer of an image or feature map contains encoded frames of reduced resolution. When only the base layer is decoded, a low-resolution output image and/or feature map can be obtained. When one or more enhancement layers are decoded together with the base layer, a high-resolution output image and/or feature map can be obtained.

In the mode for temporal scalability, the base layer is encoded with a low video or feature map frame rate. Although the frame rate is low when only the base layer is decoded, the frame rate can be increased by decoding the base layer and at least one enhancement layer together. The enhancement layer may include I-VOP encoded without prediction, P-VOP predicted from VOP of a previous layer and subsequent base layer VOP, and B-VOP predicted from VOP of previous and subsequent layers.

An input signal used for SVC or SFC may have a different resolution, frame rate, bit-depth, color format, aspect ratio, and the like between layers as described above. Accordingly, by performing prediction between layers in consideration of this point, it is possible to reduce redundancy and increase encoding performance compared to simulcast.

Various inter-layer prediction methods may be used. In order to reduce the amount of information about the encoder, the predictor, and the transformer transmitted in the enhancement layer, prediction of the encoder/predictor/transformer between layers may be performed.

Figure 4:
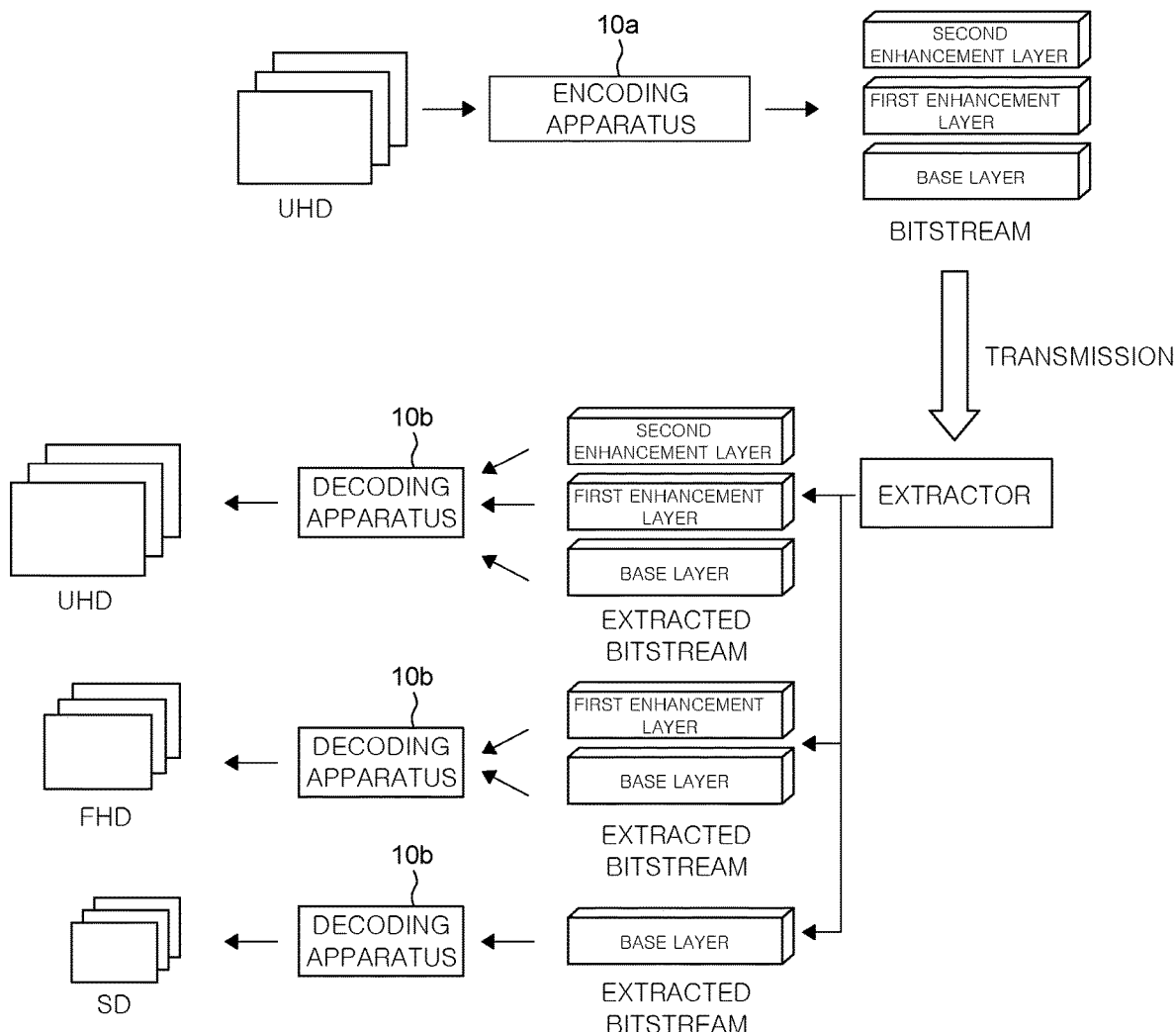
FIG. 4 is an exemplary diagram of an encoding and decoding process using SVC.

FIG. 4 illustrates an encoding and decoding process using SVC.

Referring to FIG. 4, the encoding apparatus 10a may perform SVC encoding or SFC encoding on an original video (e.g., UHD video), so that the video or feature map stream of several layers may be divided and transmitted. The various layers may include, for example, a base layer, a first enhancement layer, and a second enhancement layer as illustrated.

The base layer may be for an image of a basic resolution (e.g., SD resolution) as described later, and the first enhancement layer may include information not included in the base layer for an image of a first resolution (e.g., FHD resolution). The second enhancement layer may include information not included in the base layer and the first enhancement layer for an image of a second resolution (e.g., UHD resolution).

The base layer may be for a feature map of a base resolution (e.g., a minimum feature map resolution such as 224×224×3) as described later, the first enhancement layer may include information not included in the base layer for the feature map of the first resolution (e.g., 512×512×3 resolution). The second enhancement layer may include information not included in the first base layer and the second enhancement layer for a second resolution (e.g., a 720×720×3 feature map).

A video stream including the base layer, the first enhancement layer, and the second enhancement layer may be transmitted.

The extractor extracts the base layer and one or more enhancement layers from the received bitstream, and transmits them to the decoding apparatus 10b.

When the decoding apparatus 10b decodes only the base layer, a low-resolution output image may be obtained. However, if the decoding device 10b decodes one or more enhancement layers together with the base layer, a high-resolution output image may be obtained.

Neural Processing Unit

Figure 5:
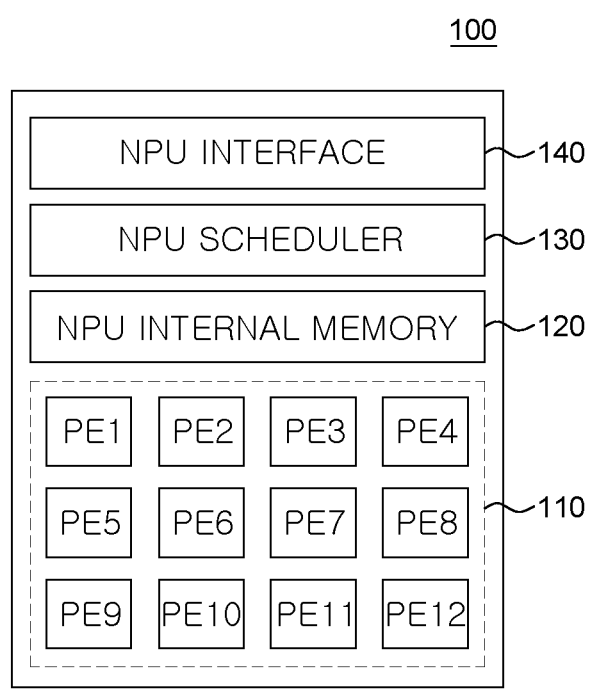
FIG. 5 is a schematic conceptual diagram illustrating a neural processing unit according to the present disclosure.

FIG. 5 illustrates a neural processing unit according to the present disclosure.

Referring to FIG. 5, a neural processing unit (NPU) 100 is a processor specialized to perform an operation for an artificial neural network.

The artificial neural network refers to a network in which are collected artificial neurons which, when various inputs or entry stimulations, multiply a weight by the inputs or stimulations, add the multiplied values, and convert a value obtained by additionally adding a deviation using an active function to transmit. The artificial neural network trained as described above may be used to output an inference result from input data.

The NPU 100 may be a semiconductor device implemented by an electric/electronic circuit. The electric/electronic circuit may refer to a circuit including a large number of electronic elements (transistors, capacitors, etc.).

The NPU 100 may include a plurality of processing elements (PE) 110, an NPU internal memory 120, an NPU scheduler 130, and an NPU interface 140. Each of the plurality of processing elements 110, the NPU internal memory 120, the NPU scheduler 130, and the NPU interface 140 may be a semiconductor circuit to which a large number of the electronic elements are connected. Therefore, some of electronic elements may be difficult to identify or be distinguished with the naked eye, but may be identified only by an operation.

For example, an arbitrary circuit may operate as a plurality of the processing elements 110, or may operate as an NPU scheduler 130. The NPU scheduler 130 may be configured to perform the function of the control unit configured to control the artificial neural network inference operation of the NPU 100.

The NPU 100 may include the plurality of processing elements 110, the NPU internal memory 120 configured to store an artificial neural network model inferred from the plurality of processing elements 110, and the NPU scheduler 130 configured to control the operation schedule with respect to the plurality of processing elements 110 and the NPU internal memory 120.

The NPU 100 may be configured to process the feature map corresponding to the encoding and decoding method using SVC or SFC.

The plurality of processing elements 110 may perform an operation for an artificial neural network.

The NPU interface 140 may communicate with various components connected to the NPU 100, for example, memories, via a system bus.

The NPU scheduler 130 may be configured to control an operation of the plurality of processing elements 110 and read/write instructions of the NPU internal memory 120 for an inference operation of the neural processing unit 100.

The NPU scheduler 130 may control the plurality of processing elements 110 and the NPU internal memory 120 based on the data locality information or the information about the structure of the artificial neural network model.

The NPU scheduler 130 may analyze or receive analyzed information on a structure of an artificial neural network model which may operate in the plurality of processing elements 110. For example, data of the artificial neural network, which may be included in the artificial neural network model may include node data (i.e., feature map) of each layer, data on a layout of layers, locality information of layers or information about the structure, and at least a portion of weight data (i.e., weight kernel) of each of connection networks connecting the nodes of the layers. The data of the artificial neural network may be stored in a memory provided in the NPU scheduler 130 or the NPU internal memory 120.

The NPU scheduler 130 may schedule an operation order of the artificial neural network model to be processed by an NPU 100 based on the data locality information or the information about the structure of the artificial neural network model.

The NPU scheduler 130 may acquire a memory address value in which feature map of a layer of the artificial neural network model and weight data are stored based on the data locality information or the information about the structure of the artificial neural network model. For example, the NPU scheduler 130 may acquire the memory address value of the feature map of the layer of the artificial neural network model and the weight data which are stored in the memory. Accordingly, the NPU scheduler 130 may acquire feature map of a layer and weight data of an artificial neural network model to be driven from the main memory, to store the acquired data in the NPU internal memory 120.

Feature map of each layer may have a corresponding memory address value.

Each of the weight data may have a corresponding memory address value.

The NPU scheduler 130 may schedule an operation order of the plurality of processing elements 110 based on the data locality information or the information about the structure of the artificial neural network model, for example, the layout information of layers of the artificial neural network or the information about the structure of the artificial neural network model.

The NPU scheduler 130 schedules based on the data locality information or the information about the structure of the artificial neural network model so that the NPU scheduler may operate in a different way from a scheduling concept of a normal CPU. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing.

In contrast, the NPU scheduler 130 may control the NPU 100 according to a determined processing order of the NPU 100 based on the data locality information or the information about the structure of the artificial neural network model.

Moreover, the NPU scheduler 130 may operate the NPU 100 according to the determined the processing order based on the data locality information or the information about the structure of the artificial neural network model and/or data locality information or information about a structure of the NPU 100 to be used.

However, the present disclosure is not limited to the data locality information or the information about the structure of the NPU 100.

The NPU scheduler 130 may be configured to store the data locality information or the information about the structure of the artificial neural network.

That is, even though only the data locality information or the information about the structure of the artificial neural network of the artificial neural network model is utilized, the NPU scheduler 130 may determine a processing sequence.

Moreover, the NPU scheduler 130 may determine the processing order of the NPU 100 by considering the data locality information or the information about the structure of the artificial neural network model and data locality information or information about a structure of the NPU 100. Furthermore, optimization of the processing is possible according to the determined processing order.

The plurality of processing elements 110 refers to a configuration in which a plurality of processing elements PE1 to PE12 configured to operate feature map and weight data of the artificial neural network is disposed. Each processing element may include a multiply and accumulate (MAC) operator and/or an arithmetic logic unit (ALU) operator, but the examples according to the present disclosure are not limited thereto.

Each processing element may be configured to optionally further include an additional special function unit for processing the additional special function.

For example, it is also possible for the processing element PE to be modified and implemented to further include a batch-normalization unit, an activation function unit, an interpolation unit, and the like.

Even though FIG. 5 illustrates a plurality of processing elements as an example, operators implemented by a plurality of multiplier and adder trees may also be configured to be disposed in parallel in one processing element, instead of the MAC. In this case, the plurality of processing elements 110 may also be referred to as at least one processing element including a plurality of operators.

The plurality of processing elements 110 is configured to include a plurality of processing elements PE1 to PE12. The plurality of processing elements PE1 to PE12 of FIG. 5 is just an example for the convenience of description and the number of the plurality of processing elements PE1 to PE12 is not limited. A size or the number of processing element arrays 110 may be determined by the number of the plurality of processing elements PE1 to PE12. The size of the plurality of processing elements 110 may be implemented by an N×M matrix. Here, N and M are integers greater than zero. The plurality of processing elements 110 may include N×M processing elements. That is, one or more processing elements may be provided.

A size of the plurality of processing elements 110 may be designed in consideration of the characteristic of the artificial neural network model in which the NPU 100 operates.

The plurality of processing elements 110 is configured to perform a function such as addition, multiplication, and accumulation required for the artificial neural network operation. In other words, the plurality of processing elements 110 may be configured to perform a multiplication and accumulation (MAC) operation.

Hereinafter, a first processing element PE1 among the plurality of processing elements 110 will be explained with an example.

Figure 6:
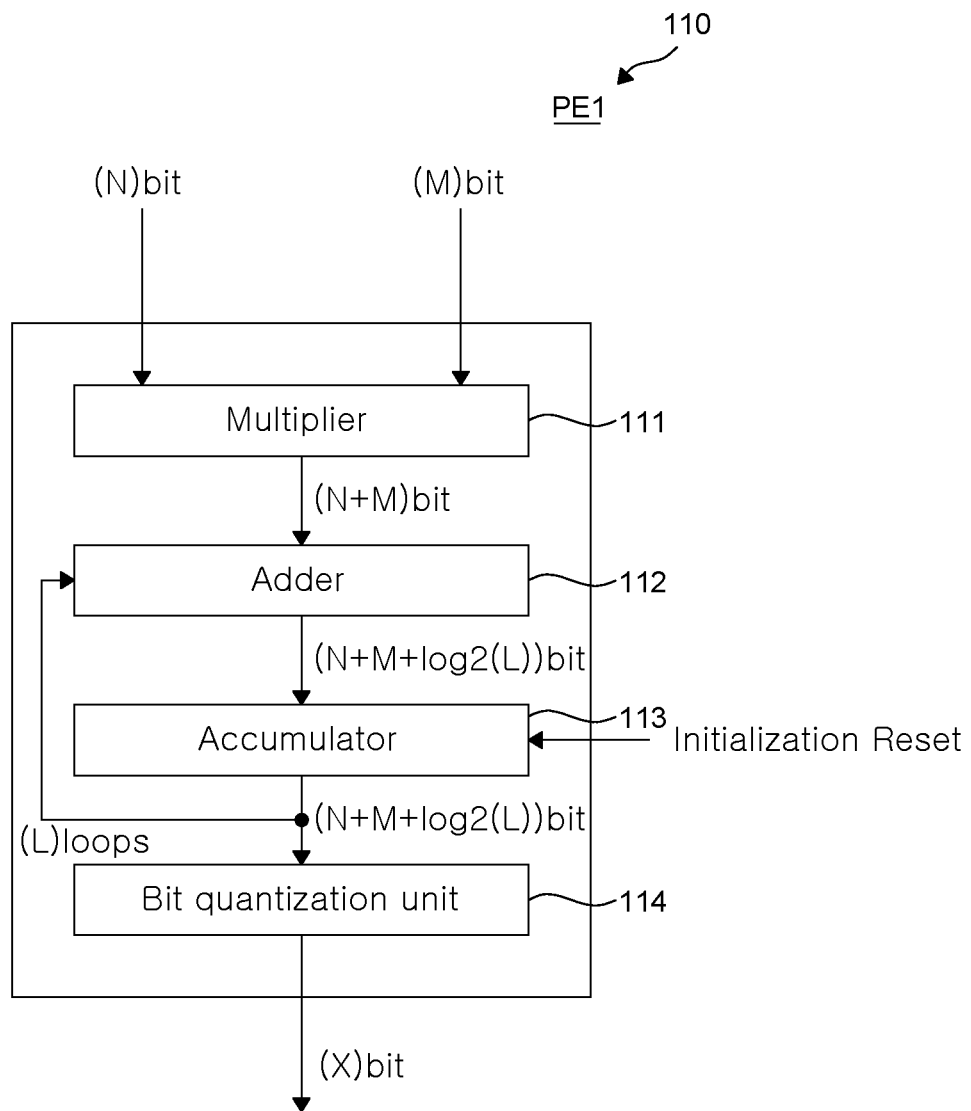
FIG. 6 is a schematic conceptual diagram illustrating one processing element among a plurality of processing elements that may be applied to the present disclosure.

FIG. 6 illustrates one processing element among a plurality of processing elements that may be applied to the present disclosure.

The NPU 100 according to the examples of the present disclosure may include the plurality of processing elements 110, the NPU internal memory 120 configured to store an artificial neural network model inferred from the plurality of processing elements 110, and the NPU scheduler 130 configured to control the plurality of processing elements 110 and the NPU internal memory 120 based on data locality information or information about a structure of the artificial neural network model. The plurality of processing elements 110 is configured to perform the MAC operation and the plurality of processing elements 110 is configured to quantize and output the MAC operation result, but the examples of the present disclosure are not limited thereto.

The NPU internal memory 120 may store all or a part of the artificial neural network model in accordance with the memory size and the data size of the artificial neural network model.

The first processing element PE1 may include a multiplier 111, an adder 112, an accumulator 113, and a bit quantizer 114. However, the examples according to the present disclosure are not limited thereto and the plurality of processing elements 110 may be modified in consideration of the operation characteristic of the artificial neural network.

The multiplier 111 multiplies input (N) bit data and (M) bit data. The operation value of the multiplier 111 is output as (N+M) bit data.

The multiplier 111 may be configured to receive one variable and one constant.

The accumulator 113 accumulates an operation value of the multiplier 111 and an operation value of the accumulator 113 using the adder 112 as many times as the number of (L) loops. Therefore, a bit width of data of an output unit and an input unit of the accumulator 113 may be output to (N+M+ log 2(L)) bits. Here, L is an integer greater than zero.

When the accumulation is completed, the accumulator 113 is applied with an initialization reset to initialize the data stored in the accumulator 113 to zero, but the examples according to the present disclosure are not limited thereto.

The bit quantizer 114 may reduce the bit width of the data output from the accumulator 113. The bit quantizer 114 may be controlled by the NPU scheduler 130. The bit width of the quantized data may be output to (X) bits. Here, X is an integer greater than zero. According to the above-described configuration, the plurality of processing elements 110 is configured to perform the MAC operation and the plurality of processing elements 110 may quantize the MAC operation result to output the result. The quantization may have an effect that the larger the (L) loops, the smaller the power consumption. Further, when the power consumption is reduced, the heat generation may also be reduced. Specifically, when the heat generation is reduced, the possibility of the erroneous operation of the NPU 100 due to the high temperature may be reduced.

Output data (X) bits of the bit quantizer 114 may serve as node data of a subsequent layer or input data of a convolution. When the artificial neural network model is quantized, the bit quantizer 114 may be configured to be supplied with quantized information from the artificial neural network model. However, it is not limited thereto and the NPU scheduler 130 may also be configured to extract quantized information by analyzing the artificial neural network model. Accordingly, the output data (X) bit is converted to a quantized bit width to be output so as to correspond to the quantized data size. The output data (X) bit of the bit quantizer 114 may be stored in the NPU internal memory 120 with a quantized bit width.

The plurality of processing elements 110 of the NPU 100 according to an example of the present disclosure may include a multiplier 111, an adder 112, and an accumulator 113. The bit quantizer 114 may be selected according to whether quantization is applied or not.

Figure 7:
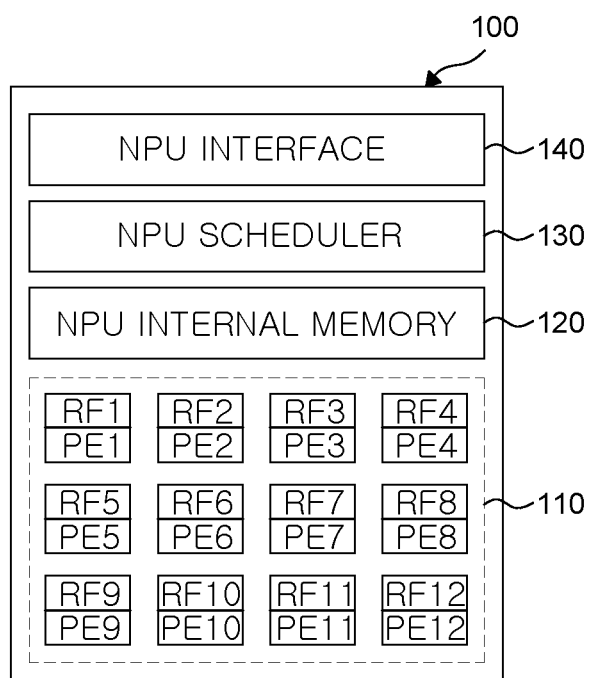
FIG. 7 is a schematic conceptual diagram illustrating a modified example of the neural processing unit of FIG. 5.

FIG. 7 illustrates a modified example of the neural processing unit 100 of FIG. 5.

The NPU 100 of FIG. 7 is substantially the same as the NPU 100 exemplarily illustrated in FIG. 5, except for the plurality of processing elements 110. Thus, redundant description will be omitted for the convenience of description.

The plurality of processing elements 110 exemplarily illustrated in FIG. 7 may further include register files RF1 to RF12 corresponding to processing elements PE1 to PE12 in addition to a plurality of processing elements PE1 to PE12.

The plurality of processing elements PE1 to PE12 and the plurality of register files RF1 to RF12 of FIG. 7 are just an example for the convenience of description and the number of the plurality of processing elements PE1 to PE12 and the plurality of register files RF1 to RF12 is not limited.

A size of, or the number of, processing element arrays 110 may be determined by the number of the plurality of processing elements PE1 to PE12 and the plurality of register files RF1 to RF12. The size of the plurality of processing elements 110 and the plurality of register files RF1 to RF12 may be implemented by an N×M matrix. Here, N and M are integers greater than zero.

An array size of the plurality of processing elements 110 may be designed in consideration of the characteristic of the artificial neural network model in which the NPU 100 operates. For additional explanation, the memory size of the register file may be determined in consideration of a data size, a required operating speed, and a required power consumption of the artificial neural network model to operate.

The register files RF1 to RF12 of the NPU 100 are static memory units which are directly connected to the processing elements PE1 to PE12. For example, the register files RF1 to RF12 may be configured by flip-flops and/or latches. The register files RF1 to RF12 may be configured to store the MAC operation value of the corresponding processing elements PE1 to PE12. The register files RF1 to RF12 may be configured to provide or be provided with the weight data and/or node data to or from the NPU internal memory 120.

It is also possible that the register files RF1 to RF12 are configured to perform a function of a temporary memory of the accumulator during MAC operation.

Figure 8:
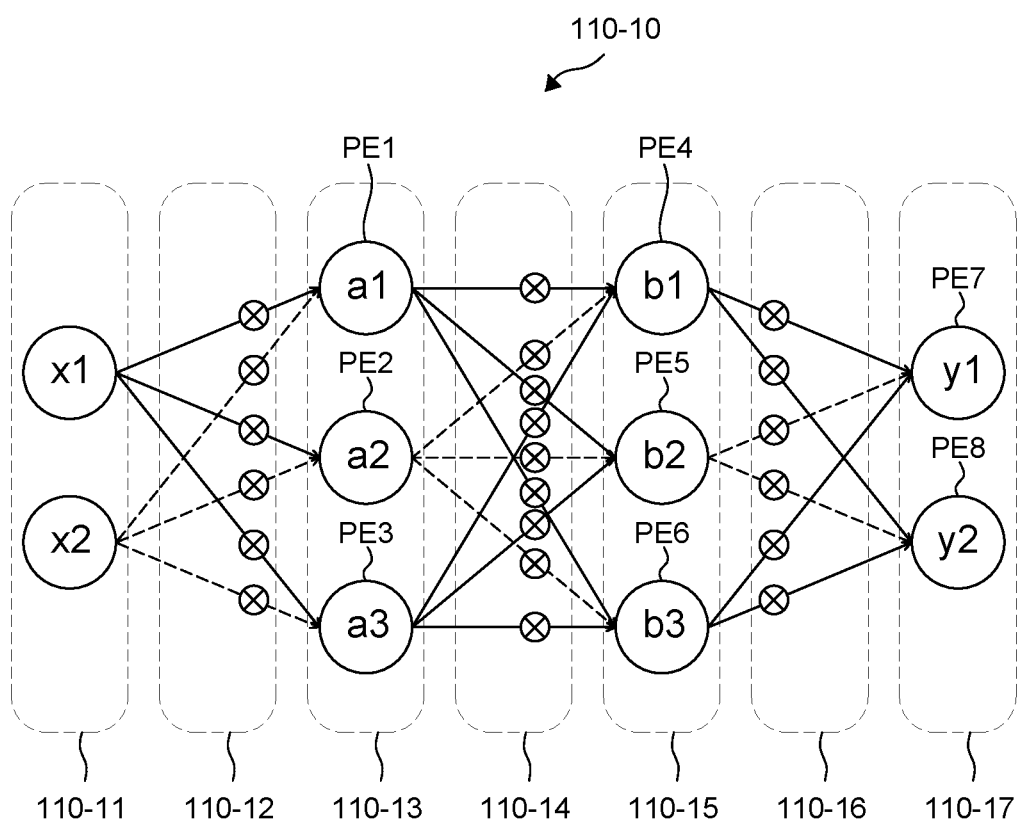
FIG. 8 is a schematic conceptual diagram illustrating an exemplary artificial neural network model.

FIG. 8 illustrates an exemplary artificial neural network model.

Hereinafter, an operation of an exemplary artificial neural network model 110-10 which may operate in the NPU 100 will be explained.

The exemplary artificial neural network model 110-10 of FIG. 4 may be an artificial neural network which is trained in the NPU 100 as shown in FIG. 1 or FIG. 4 or trained in a separate machine learning device. The artificial neural network model may be an artificial neural network which is trained to perform various inference functions such as object recognition or voice recognition.

The artificial neural network model 110-10 may be a deep neural network (DNN).

However, the artificial neural network model 110-10 according to the examples of the present disclosure is not limited to the deep neural network.

For example, the artificial neural network model may be a trained model to perform inference such as object detection, object segmentation, image/video reconstruction, image/video enhancement, object tracking, event recognition, event prediction, anomaly detection, density estimation, event search, measurement, and the like.

For example, the artificial neural network model can be a model such as Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM, and the like. For example, the artificial neural network model may be a model such as a generative adversarial network (GAN), a transformer, or the like. However, the present disclosure is not limited thereto, and new artificial neural network models to operate in the NPU are being continuously released.

However, the present disclosure is not limited thereto. Further, the artificial neural network model 110-10 may be an ensemble model based on at least two different models.

The artificial neural network model 110-10 may be stored in the NPU internal memory 120 of the NPU 100.

Hereinafter, an inference process by the exemplary artificial neural network model 110-10, being performed by the NPU 100, will be described with reference to FIG. 5.

The artificial neural network model 110-10 may be an exemplary deep neural network model including an input layer 110-11, a first connection network 110-12, a first hidden layer 110-13, a second connection network 110-14, a second hidden layer 110-15, a third connection network 110-16, and an output layer 110-17. However, the present disclosure is not limited only to the artificial neural network model illustrated in FIG. 8. The first hidden layer 110-13 and the second hidden layer 110-15 may also be referred to as a plurality of hidden layers.

The input layer 110-11 may exemplarily include input nodes x1 and x2. That is, the input layer 110-11 may include information about two input values. The NPU scheduler 130 illustrated in FIG. 5 or 7 may set a memory address in which information about an input value from the input layer 110-11 is stored, in the NPU internal memory 120 of FIG. 5 or 7.

For example, the first connection network 110-12 may include information about six weight values for connecting nodes of the input layer 110-11 to nodes of the first hidden layer 110-13, respectively. The NPU scheduler 130 of FIG. 5 or 7 may set a memory address, in which information about a weight value of the first connection network 110-12 is stored, in the NPU internal memory 120. Each weight value is multiplied with the input node value, and an accumulated value of the multiplied values is stored in the first hidden layer 110-13. Here, the nodes may be referred to as a feature map.

For example, the first hidden layer 110-13 may include nodes a1, a2, and a3. That is, the first hidden layer 110-13 may include information about three node values. The NPU scheduler 130 illustrated in FIG. 5 or 7 may set a memory address for storing information about a node value of the first hidden layer 110-13, in the NPU internal memory 120.

The NPU scheduler 130 may be configured to schedule an operation order so that the first processing element PE1 performs the MAC operation of the a1 node of the first hidden layer 110-13. The NPU scheduler 130 may be configured to schedule the operation order so that the second processing element PE2 performs the MAC operation of the a2 node of the first hidden layer 110-13. The NPU scheduler 130 may be configured to schedule an operation order so that the third processing element PE3 performs the MAC operation of the a3 node of the first hidden layer 110-13. Here, the NPU scheduler 130 may pre-schedule the operation order so that the three processing elements perform each MAC operation simultaneously in parallel.

For example, the second connection network 110-14 may include information about nine weight values for connecting nodes of the first hidden layer 110-13 to nodes of the second hidden layer 110-15, respectively. The NPU scheduler 130 of FIG. 5 or 7 may set a memory address for storing, in the NPU internal memory 120, information about a weight value of the second connection network 110-14. The weight value of the second connection network 110-14 is multiplied with the node value input from the corresponding first hidden layer 110-13 and the accumulated value of the multiplied values is stored in the second hidden layer 110-15.

For example, the second hidden layer 110-15 may include nodes b1, b2, and b3. That is, the second hidden layer 110-15 may include information about three node values. The NPU scheduler 130 may set a memory address for storing information about a node value of the second hidden layer 110-15, in the NPU internal memory 120.

The NPU scheduler 130 may be configured to schedule an operation order so that the fourth processing element PE4 performs the MAC operation of the b1 node of the second hidden layer 110-15. The NPU scheduler 130 may be configured to schedule an operation order so that the fifth processing element PE5 performs the MAC operation of the b2 node of the second hidden layer 110-15. The NPU scheduler 130 may be configured to schedule an operation order so that the sixth processing element PE6 performs the MAC operation of the b3 node of the second hidden layer 110-15.

Here, the NPU scheduler 130 may pre-schedule the operation order so that the three processing elements perform each MAC operation simultaneously in parallel.

Here, the NPU scheduler 130 may determine scheduling so that the operation of the second hidden layer 110-15 is performed after the MAC operation of the first hidden layer 110-13 of the artificial neural network model.

That is, the NPU scheduler 130 may be configured to control the plurality of processing elements 110 and the NPU internal memory 120 based on the data locality information or structure information of the artificial neural network model.

For example, the third connection network 110-16 may include information about six weight values which connect nodes of the second hidden layer 110-15 and nodes of the output layer 110-17, respectively. The NPU scheduler 130 may set a memory address for storing, in the NPU internal memory 120, information about a weight value of the third connection network 110-16. The weight value of the third connection network 110-16 is multiplied with the node value input from the second hidden layer 110-15, and the accumulated value of the multiplied values is stored in the output layer 110-17.

For example, the output layer 110-17 may include nodes y1 and y2. That is, the output layer 110-17 may include information about two node values. The NPU scheduler 130 may set a memory address for storing, in the NPU internal memory 120, information about a node value of the output layer 110-17.

The NPU scheduler 130 may be configured to schedule the operation order so that the seventh processing element PE7 performs the MAC operation of the y1 node of the output layer 110-17. The NPU scheduler 130 may be configured to schedule the operation order so that the eighth processing element PE8 performs the MAC operation of the y2 node of the output layer 110-15.

Here, the NPU scheduler 130 may pre-schedule the operation order so that the two processing elements simultaneously perform the MAC operation in parallel.

Here, the NPU scheduler 130 may determine the scheduling so that the operation of the output layer 110-17 is performed after the MAC operation of the second hidden layer 110-15 of the artificial neural network model.

That is, the NPU scheduler 130 may be configured to control the plurality of processing elements 110 and the NPU internal memory 120 based on the data locality information or structure information of the artificial neural network model.

That is, the NPU scheduler 130 may analyze a structure of an artificial neural network model or receive the analyzed information which may operate in the plurality of processing elements 110. Information of the artificial neural network, which may be included in the artificial neural network model, may include information about a node value of each layer, placement data locality information of layers or information about the structure, and information about a weight value of each of connection networks connecting the nodes of the layers.

The NPU scheduler 130 is provided with data locality information or information about a structure of the exemplary artificial neural network model 110-10 so that the NPU scheduler 130 may determine an operation order from input to output of the artificial neural network model 110-10.

Accordingly, the NPU scheduler 130 may set the memory address in which the MAC operation values of each layer are stored, in the NPU internal memory 120, in consideration of the scheduling order.

That is, the NPU internal memory 120 may be configured to preserve weight data of connection networks stored in the NPU internal memory 120 while the inference operation of the NPU 100 is maintained. Therefore, frequency of the memory reading and writing operations may be reduced.

That is, the NPU internal memory 120 may be configured to reuse the MAC operation value stored in the NPU internal memory 120 while the inference operation is maintained.

Figure 9A:
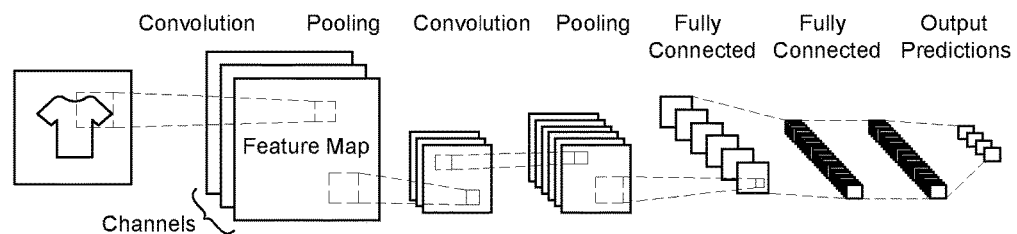
FIG. 9A is a diagram for explaining a basic structure of a convolutional neural network.

FIG. 9A diagrams the basic structure of a convolutional neural network.

Referring to FIG. 9A, a convolutional neural network may be a combination of one or a plurality of convolutional layers, a pooling layer, and a fully connected layer.

In the example of the present disclosure, in the convolutional neural network, there is a kernel for extracting features of an input image of a channel for each channel. The kernel may be composed of a two-dimensional matrix, and convolution operation is performed while traversing input data. The size of the kernel may be arbitrarily determined, and the stride at which the kernel traverses input data may also be arbitrarily determined. A result of convolution of all input data per kernel may be referred to as a feature map or an activation map. Hereinafter, the kernel may include a set of weight values or a plurality of sets of weight values. The number of kernels for each layer may be referred to as the number of channels. The kernel may be referred to as a matrix-type weight, or the kernel may be referred to as a weight.

As such, since the convolution operation is an operation formed by combining input data and a kernel, an activation function for adding non-linearity may be applied thereafter. When an activation function is applied to a feature map that is a result of a convolution operation, it may be referred to as an activation map.

Specifically, referring to FIG. 9A, the convolutional neural network includes at least one convolutional layer, at least one pooling layer, and at least one fully connected layer.

For example, convolution can be defined by two main parameters: the size of the input data (typically a 1×1, 3×3, or 5×5 matrix) and the depth of the output feature map (the number of kernels). These key parameters can be computed by convolution. These convolutions may start at depth 32, continue to depth 64, and end at depth 128 or 256. The convolution operation may mean an operation of sliding a kernel of size 3×3 or 5×5 over an input image matrix that is input data, multiplying each weight of the kernel and each element of the input image matrix that overlaps, and then adding them all.

An activation function may be applied to the output feature map generated in this way to finally output an activation map. In addition, the weight used in the current layer may be transmitted to the next layer through convolution. The pooling layer may perform a pooling operation to reduce the size of the feature map by down-sampling the output data (i.e., the activation map). For example, the pooling operation may include, but is not limited to, max pooling and/or average pooling.

The maximum pooling operation uses the kernel, and outputs the maximum value in the area of the feature map overlapping the kernel by sliding the feature map and the kernel. The average pooling operation outputs an average value within the area of the feature map overlapping the kernel by sliding the feature map and the kernel. As such, since the size of the feature map is reduced by the pooling operation, the number of weights of the feature map is also reduced.

The fully connected layer may classify data output through the pooling layer into a plurality of classes (i.e., inferenced values), and output the classified class and a score thereof. Data output through the pooling layer forms a three-dimensional feature map, and this three-dimensional feature map can be converted into a one-dimensional vector and input as a fully connected layer.

Figure 9B:
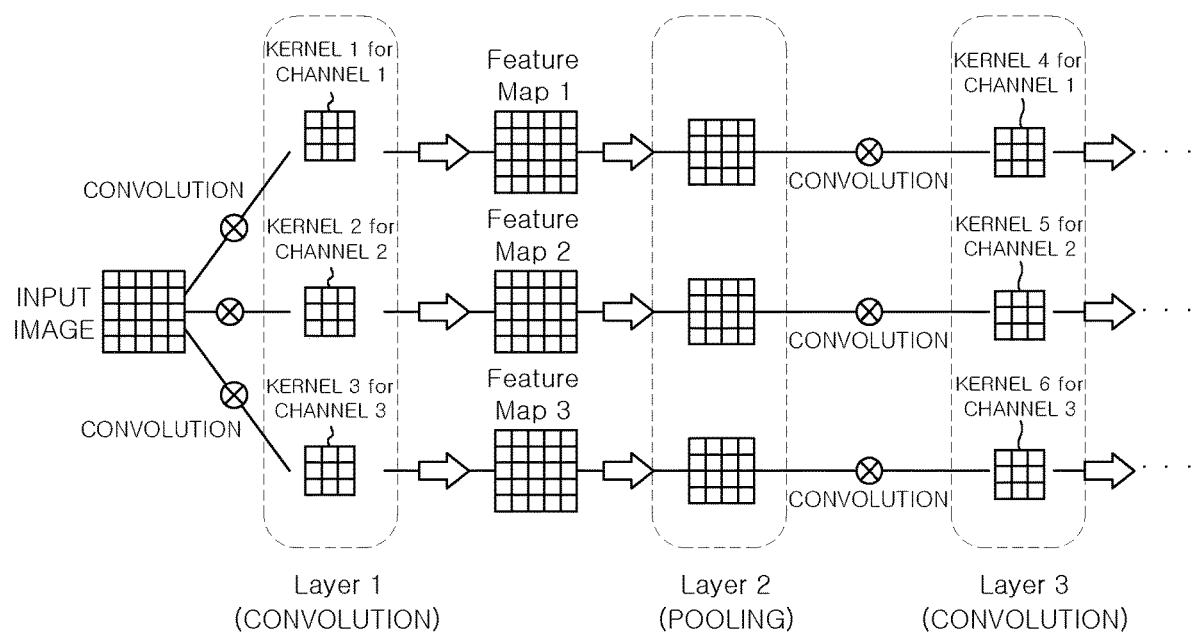
FIG. 9B is a general diagram illustrating the operation of a convolutional neural network in an easy-to-understand manner.

FIG. 9B illustrates the operation of a convolutional neural network in an easy-to-understand manner.

Referring to FIG. 9B, the input image is a two-dimensional matrix that is 5×5 in size. Further, in FIG. 9B, three nodes, that is, a channel 1, a channel 2, and a channel 3, are used.

First, a convolution operation of the layer 1 will be described.

The input image is convoluted with a kernel 1 for a channel 1 at a first node of the layer 1, and a feature map 1 is output as a result. Further, the input image is convoluted with a kernel 2 for a channel 2 at a second node of the layer 1, and a feature map 2 is output as a result. The input image is convoluted with a kernel 3 for a channel 3 at a third node, and a feature map 3 is output as a result.

Next, a pooling operation of the layer 2 will be described.

The feature map 1, the feature map 2, and the feature map 3 output from the layer 1 are input to three nodes of the layer 2. Layer 2 receives feature maps output from the layer 1 as inputs to perform the pooling. The pooling may reduce a size or emphasize a specific value in the matrix. The pooling method may include max pooling, average pooling, and minimum pooling. The max pooling is used to collect maximum values in a specific area of the matrix, and the average pooling is used to calculate an average in a specific area.

In order to process each convolution, the processing elements PE1 to PE12 of the NPU 100 are configured to perform a MAC operation.

In the example of FIG. 9B, a feature map of a 5×5 matrix is reduced to a 4×4 matrix by the pooling.

Specifically, the first node of the layer 2 performs the pooling with the feature map 1 for the channel 1 as an input, and then outputs a 4×4 matrix. The second node of the layer 2 performs the pooling with the feature map 2 for the channel 2 as an input, and then outputs a 4×4 matrix. The third node of the layer 2 performs the pooling with the feature map 3 for the channel 3 as an input, and then outputs a 4×4 matrix.

Next, a convolution operation of the layer 3 will be described.

A first node of the layer 3 receives the output from the first node of the layer 2 as an input to perform the convolution with a kernel 4 and output a result thereof. A second node of the layer 3 receives the output from the second node of the layer 2 as an input to perform the convolution with a kernel 5 for the channel 2 and outputs a result thereof. Similarly, a third node of the layer 3 receives the output from the third node of the layer 2 as an input to perform the convolution with a kernel 6 for the channel 3 and outputs a result thereof.

As described above, the convolution and the pooling are repeated and finally, as illustrated in FIG. 9A, a fully connected layer may be output. The output may be input to the artificial neural network for image recognition again.

Video Coding for Machines

Recently, with the development of various industrial fields such as surveillance, intelligent transportation, smart city, intelligent industry, and intelligent Content, the amount of image or feature map data consumed by machines is increasing. On the other hand, the traditional image compression method currently in use is a technology developed in consideration of the characteristics of human vision perceived by the viewer and contains unnecessary information, making it inefficient in performing machine tasks. Therefore, there is a demand for a study on a video codec technology for efficiently compressing a feature map for performing a machine task.

Video coding for machine (VCM) technology is being discussed in the Moving Picture Experts Group (MPEG), an international standardization group for multimedia encoding. VCM is an image or feature map encoding technology that is based on the machine vision, not the viewer's point of view.

Present Disclosure

FIGS. 10A to 10D respectively illustrate configurations of an NPU including a VCM encoder and an NPU including a VCM decoder.

Figure 10A:
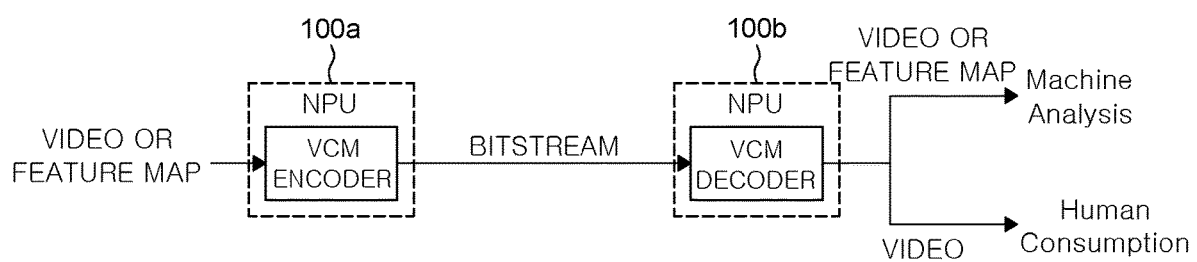
FIGS. 10A to 10D are exemplary views respectively illustrating configurations of an NPU including a VCM encoder and an NPU including a VCM decoder.

Referring to FIG. 10A, the first NPU 100a may include a VCM encoder, and the second NPU 100b may include a VCM decoder.

When the VCM encoder in the first NPU 100a encodes the video and/or the feature map and transmits it as a bitstream, the VCM decoder in the second NPU 100b may decode and output the bitstream. In this case, the VCM decoder in the second NPU 100b may output one or more videos and/or feature maps. For example, the VCM decoder in the second NPU 100b may output a first feature map for analysis using a machine, and may output a first image for viewing by a user. The first image may have a higher resolution than that of the first feature map.

Figure 10B:
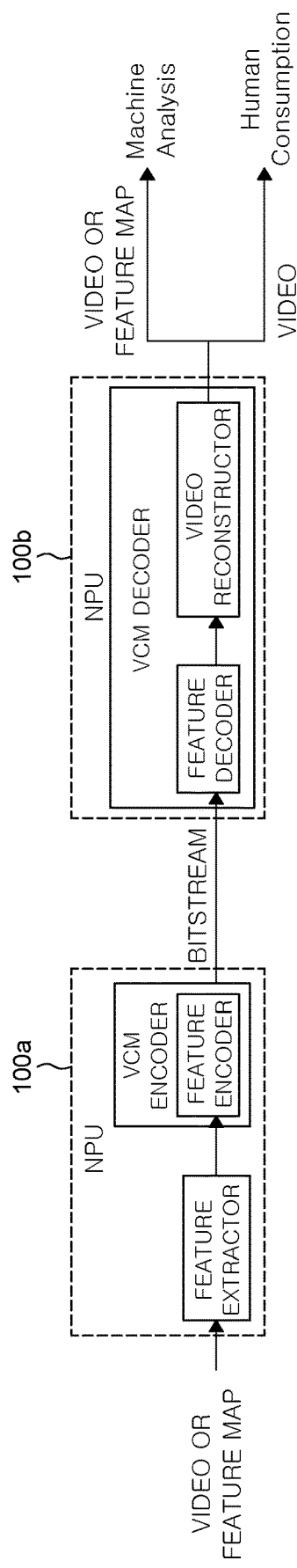

Referring to FIG. 10B, the first NPU 100a may include a feature extractor for extracting a feature map and a VCM encoder.

The VCM encoder in the first NPU 100a may include a feature encoder. The second NPU 100b may include a VCM decoder. The VCM decoder in the second NPU 100b may include a feature decoder and a video reconstructor. The feature decoder may decode the feature map from the bitstream and output a first feature map for analysis using a machine. The video regenerator may regenerate and output a first image for viewing by a user from a bitstream.

Figure 10C:
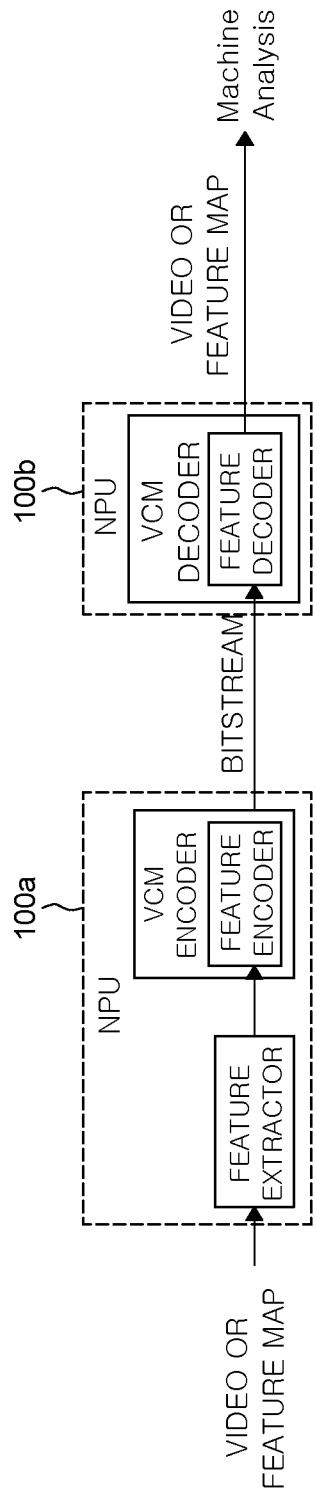

Referring to FIG. 10C, the first NPU 100a may include a feature extractor for extracting a feature map and a VCM encoder.

The VCM encoder in the first NPU 100a may include a feature encoder. The second NPU 100b may include a VCM decoder. The VCM decoder in the second NPU 100b may include a feature decoder. The feature decoder may decode the feature map from the bitstream and output a first feature map for analysis using a machine. That is, the bitstream can be encoded only as a feature map, not as an image. In more detail, the feature map may be data including information on features for processing a specific task of a machine based on an image.

Figure 10D:
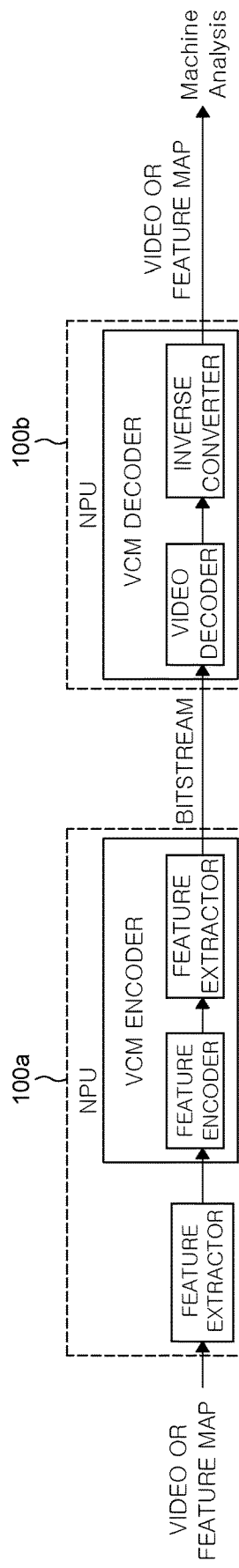

Referring to FIG. 10D, the first NPU 100a may include a feature extractor for extracting a feature map and a VCM encoder.

The VCM encoder in the first NPU 100a may include a feature converter and a video encoder. The second NPU 100b may include a VCM decoder. The VCM decoder in the second NPU 100b may include a video decoder and an inverse converter.

Referring to FIGS. 10A to 10D, the first NPU 100a may include at least a VCM encoder, and the second NPU 100b may include at least a VCM decoder. However, the present disclosure is not limited thereto, and the VCM encoder may be modified to include the first NPU 100a, or the VCM decoder may be modified to include the second NPU 100b.

The first NPU 100a may generate a feature map by processing an artificial intelligence operation (e.g., convolution). The first NPU 100a may be transmitted after encoding the feature map by processing the artificial intelligence operation.

The second NPU 100b may receive the encoded feature map. The second NPU 100b may decode the encoded feature map by processing an artificial intelligence operation (e.g., deconvolution).

In order to process artificial intelligence computation, an artificial neural network model of a specific structure can be used. For example, for feature map extraction, the NPU may process a convolution operation. For example, for feature map encoding, the NPU may process a convolution operation. For example, for decoding the encoded feature map, the NPU may process a deconvolution operation.

The artificial neural network model may have a multi-layered structure, and the artificial neural network model may include a backbone network. The feature map generated through the artificial intelligence operation of the first NPU 100a may be a feature map generated in a specific layer of the multi-layered artificial neural network model. That is, the feature map may be at least one feature map generated in at least one layer of the multi-layered artificial neural network model. The feature map generated in a specific layer of the multi-layered artificial neural network model may be a feature map suitable for analysis using a specific machine.

Figure 11A:
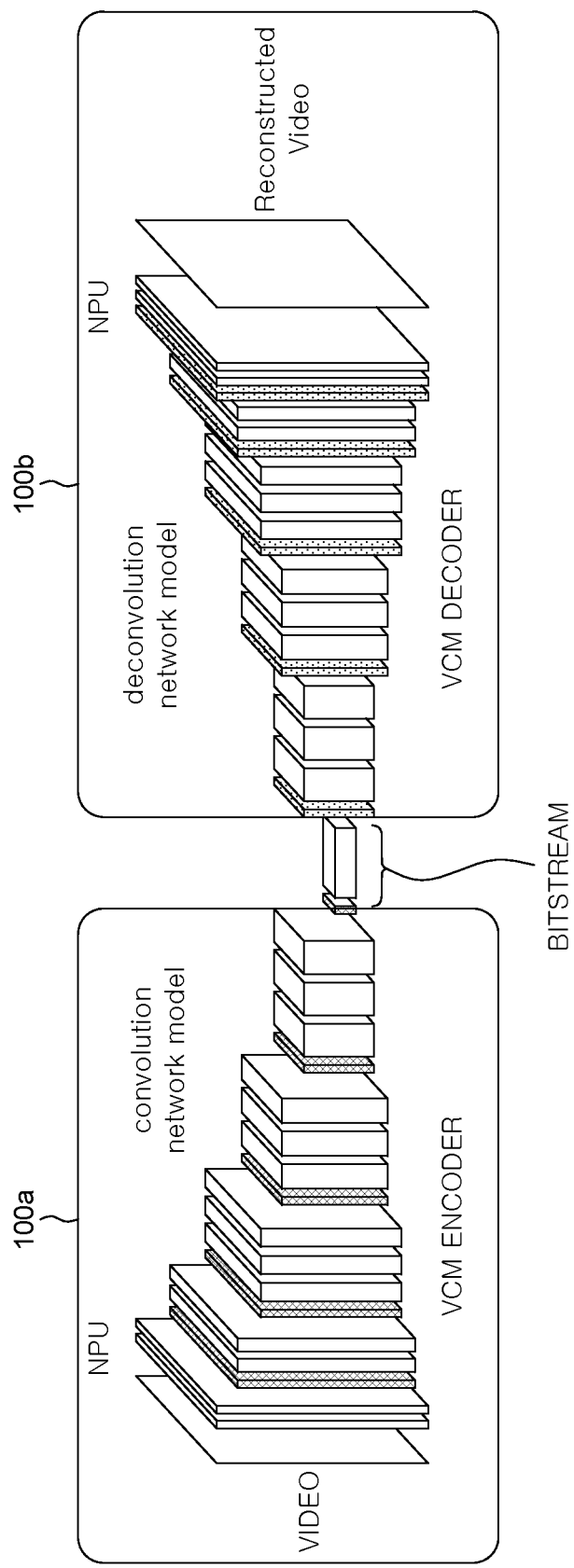
FIGS. 11A and 11B are exemplary diagrams respectively illustrating positions of a bitstream in an artificial neural network model.
Figure 11B:
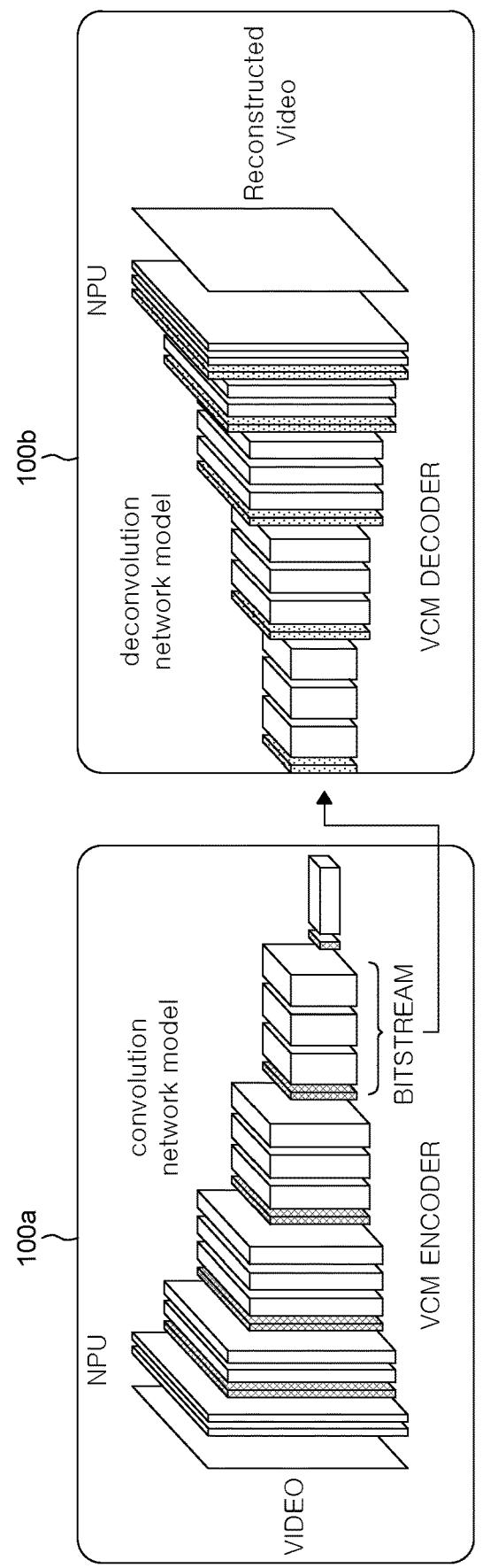

FIGS. 11A and 11B respectively illustrate positions of a bitstream in an artificial neural network model.

As can be seen with reference to FIG. 11A, when the first NPU 100a or the VCM encoder receives a video, using an artificial neural network model (e.g., a convolutional network model), it is possible to generate feature maps. FIG. 11A shows an example of transmitting a feature map in a fully connected layer corresponding to the last layer of the convolutional network model as a bitstream.

Then, the second NPU 100b or the VCM decoder may decode the bitstream including the feature map using the deconvolution network model.

On the other hand, referring to FIG. 11B, an example is shown in which feature maps generated in intermediate layers of an artificial neural network model (e.g., a convolutional network model) are transmitted as a bitstream, rather than transmission of a feature map in a fully connected layer as a bitstream.

Figure 12:
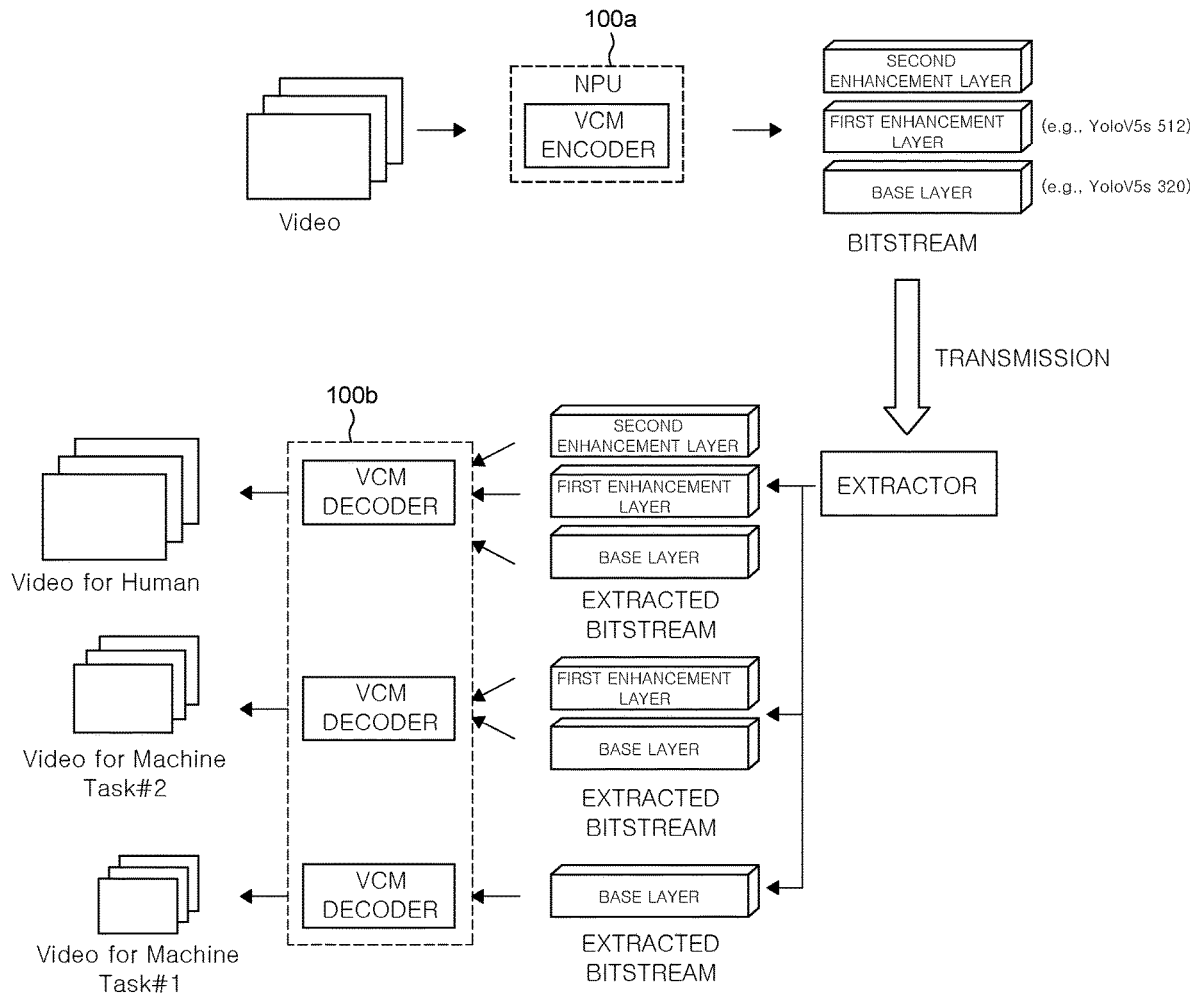
FIG. 12 is an exemplary view illustrating an example of the present disclosure.

FIG. 12 illustrates an example of the present disclosure.

Referring to FIG. 12, the first NPU 100a and the second NPU 100b is shown.

The server shown in FIG. 12 may transmit information about an artificial neural network (ANN) model, for example, information including weights of YoloV5s model to the first NPU 100a.

The first NPU 100a may include a VCM encoder for encoding the input video. Although not shown, the first NPU 100a may further include a feature extractor as shown in FIG. 10B, 10C, or 10D. The VCM encoder in the first NPU 100a may include a feature encoder as shown in FIG. 10B or 10C. Alternatively, the VCM encoder in the first NPU 100a may include a feature converter and/or a video encoder as shown in FIG. 10D.

The second NPU 100b may include at least one VCM decoder.

The VCM decoder in the second NPU 100b may include a feature decoder and/or a video regenerator as shown in FIG. 10B. Alternatively, the VCM decoder in the second NPU 100b may include a feature decoder as shown in FIG. 10C. Alternatively, the VCM decoder in the second NPU 100b may include a video decoder and/or an inverse converter as shown in FIG. 10D.

The VCM encoder in the first NPU 100a may support various scalable encoding modes. For example, a mode for spatial scalability provides layers of spatial resolution, and a mode for temporal scalability provides layers of frame rate. In addition, quality scalability and complexity scalability provide a layer of visual quality of an image and a layer of complexity of a decoding method.

The base layer of the image and/or feature map with spatial scalability includes encoded frames of reduced resolution. When only the base layer is decoded, a low-resolution output image can be obtained. Decoding at least one enhancement layer along with the base layer can provide a high-resolution output image and/or feature map.

The VCM encoder in the first NPU 100a performs SVC or SFC encoding on the original video and/or feature map (e.g., UHD or FHD video), so that it can be divided into video or feature map streams of several layers and transmitted.

As illustrated, a plurality of layers may include, for example, a base layer, a first enhancement layer, and a second enhancement layer.

The base layer may be encoded using a first artificial neural network model (e.g., YoloV5s 320), and the first enhancement layer may be encoded using a second artificial neural network model (e.g., YoloV5s 512). The second enhancement layer may be encoded using a second artificial neural network model. Alternatively, the second enhancement layer may be encoded using a video encoder in the VCM encoder shown in FIG. 10D.

However, the present disclosure is not limited to the enhancement layer, and the enhancement layer may be referred to as various layers such as an extension layer, an additional layer, and a lower layer.

The artificial neural network model may be, for example, YOLO. The you-only-look-once (YOLO) is an algorithm for object detection, and is an algorithm that can predict an object existing in an image and the position of the object by viewing the image only once. Instead of detecting it as an object to be classified, it approaches a single regression problem by dividing the bounding box multidimensionally and applying class probability. The input image is divided into a grid form of a tensor through CNN, and an object in the corresponding area is recognized by generating an object bounding box and class probability according to each section. Because YOLO does not apply a separate network for extracting candidate regions, it shows superior performance in terms of processing time than Faster R-CNN.

A video stream including the base layer, the first enhancement layer, and the second enhancement layer may be transmitted.

The VCM encoder may generate a bitstream including a specific number of enhancement layers according to an available bandwidth of a transmission channel.

The VCM encoder may generate a bitstream in which at least one enhancement layer is selectively omitted according to an available bandwidth of a transmission channel.

The VCM encoder may generate a bitstream to which at least one enhancement layer is selectively added according to an available bandwidth of a transmission channel.

The VCM decoder may operate to receive only the base layer and at least some enhancement layers of the bitstream.

The available bandwidth of the transmission channel may vary in real time or at a specific period. The available bandwidth of the transmission channel may be varied due to various reasons. For example, the bandwidth of a transmission channel may be reduced for a specific time according to an increase in the communication amount.

Accordingly, the VCM encoder may be configured to acquire the available bandwidth of the transmission channel. The VCM encoder may vary the number of enhancement layers according to available bandwidth.

The VCM encoder may be configured to encode the enhancement layer information included in the bitstream. Accordingly, the VCM decoder may be configured to determine the number of enhancement layers of the bitstream. In addition, the VCM decoder may be configured to detect an available bandwidth of the transport channel. The number of at least one enhancement layer included in one received frame may vary according to the state of the transmission channel.

The NPU may determine the number of at least one enhancement layer included in the one received frame according to the state of a transmission channel, and feed it back to the encoding device.

The at least one enhancement layer may be included in the one frame in an ascending order according to indexes of at least one enhancement layer.

The extractor may extract the base layer and at least one enhancement layer from the received bitstream and transmit to the second NPU 100b.

The second NPU 100b may decode by an adequate VCM decoder according to a required task.

For example, as illustrated, for machine task No. 1, only the base layer in the video stream can be decoded. For decoding of the base layer, a first artificial neural network model (e.g., YoloV5s 320) may be used.

Alternatively, for machine task No. 2, only the base layer and the first enhancement layer in the video stream can be decoded. For decoding of the base layer and the first enhancement layer, a second artificial neural network model (e.g., YoloV5s 512) may be used.

Alternatively, for viewing by a user, the base layer and the first enhancement layer and the second enhancement layer in the video stream may be decoded.

Examples of the present disclosure are merely examples, provided to easily explain the technical content of the present disclosure and to help the understanding of the present disclosure, and are not intended to limit the scope of the present disclosure. It will be apparent to those of ordinary skill in the art to which the present disclosure pertains those other modified examples may be implemented in addition to the examples described above.

The claims described herein may be combined in various ways. For example, the technical features of the method claim of the present disclosure may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

[National R&D Project Supporting This Invention]
 [Project Identification Number] 1711152851
 [Task Number] 2020-0-00364-003
 [Name of Ministry] Ministry of Science and ICT
 [Name of Task Management (Specialized) Institution] Institute of Information & Communications Technology Planning & Evaluation
 [Research Project Title] Development of Semiconductor Technology Applicable for Artificial Intelligence
 [Research Task Name] Development of NPU and Application System for Enhancing Communication Technology for Vehicles based on Artificial Intelligence (AI)
 [Contribution rate] 1/1
 [Name of the organization performing the task] DeepX Co., Ltd.
 [Research Period] 2022.01.01-2022.12.31

What is claimed is:

1. A neural processing unit (NPU) for decoding video or feature map, the NPU comprising:
 a first circuitry arranged as at least one processing element (PE) for performing operations of an artificial neural network, by using data included in a received bitstream,
 wherein the data included in the received bitstream comprises one or more feature maps, which have been extracted at any intermediate layer of an artificial neural network model, the one or more feature maps being used for a machine analysis task, and
 wherein the data included in the received bitstream comprises:
  data of a base layer; or
  the data of the base layer and data of at least one enhancement layer,
 wherein the data of the base layer relates to a first artificial neural network model and is used for a first machine task, and
 wherein the data of the at least one enhancement layer relates to a second artificial neural network model and is used for a second machine task.

2. The NPU of claim 1, wherein at least a portion of the at least one enhancement layer of the received bitstream is configured to be selectively processed.

3. The NPU of claim 1, wherein at least a portion of the at least one enhancement layer is configured to be selectively processed according to an available bandwidth of a transmission channel of the received bitstream.

4. The NPU of claim 1, wherein at least a portion of the at least one enhancement layer is configured to be selectively processed according to a preset machine analysis task.

5. The NPU of claim 1, wherein an available bandwidth of a transmission channel of the received bitstream is configured to be detected.

6. The NPU of claim 1, wherein the at least one PE is configured to selectively process at least a portion of the at least one enhancement layer according to a preset machine analysis task.

7. The NPU of claim 1, wherein a number of the at least one enhancement layer included in one frame is varied according to a condition of a transmission channel.

8. The NPU of claim 1, wherein the NPU is configured to determine a number of the at least one enhancement layer included in one frame according to a condition of a transmission channel and feedback to an encoder.

9. The NPU of claim 1, wherein the at least one enhancement layer is included in one frame in ascending order according to indexes of layers of the at least one enhancement layer.

10. A neural processing unit (NPU) for encoding video or feature map, the NPU comprising:
 a first circuitry arranged as at least one processing element (PE) for performing operations of an artificial neural network thereby outputting one or more feature maps,
 wherein the one or more feature maps are packed into a bitstream,
 wherein the one or more feature maps are extracted at any intermediate layer of an artificial neural network model and used for a machine analysis task of a decoder, and
 wherein the bitstream includes
  data of a base layer; or
  the data of the base layer and data of at least one enhancement layer,
 wherein the data of the base layer relates to a first artificial neural network model and is used for a first machine task, and
 wherein the data of the at least one enhancement layer relates to a second artificial neural network model and is used for a second machine task.

11. The NPU of claim 10, wherein a number of the at least one enhancement layer of the bitstream is adjusted according to an available bandwidth of a transmission channel.

12. The NPU of claim 10, wherein a number of the at least one enhancement layer of the bitstream is adjusted for at least one frame interval.

13. The NPU of claim 10, wherein the at least one PE is configured to selectively process at least a portion of a plurality of enhancement layers according to a preset machine analysis task.

14. The NPU of claim 10, wherein the at least one PE is configured to process the base layer and a first enhancement layer according to a first machine analysis task.

15. The NPU of claim 10, wherein the at least one PE is configured to process the base layer, a first enhancement layer, and a second enhancement layer according to a second machine analysis task.

16. The NPU of claim 10, wherein a number of the at least one enhancement layer included in one frame is varied according to a condition of a transmission channel.

17. The NPU of claim 10, wherein the NPU is configured to receive feedback on a number of at least one enhancement layer included in one frame from a decoder.

18. The NPU of claim 10, wherein the at least one enhancement layer is included in one frame in ascending order according to indexes of layers of the at least one enhancement layer.

19. A VCM decoder for decoding video and/or feature map, the VCM decoder comprising:
- a first circuitry arranged as at least one processing element (PE) for performing operations of an artificial neural network, by using data included in a received bitstream,
- wherein the data included in the received bitstream comprises one or more feature maps, which have been extracted at any intermediate layer of an artificial neural network model, are used for a machine analysis task, and
- wherein the data included in the received bitstream comprises:
  - data of a base layer, or
  - the data of the base layer and data of at least one enhancement layer,
  - wherein the data of the base layer relates to a first artificial neural network model and is used for a first machine task, and
  - wherein the data of the at least one enhancement layer relates to a second artificial neural network model and is used for a second machine task.

20. A VCM encoder for encoding video and/or feature map, the VCM encoder comprising:
- a first circuitry arranged as at least one processing element (PE) for performing operations of an artificial neural network thereby outputting one or more feature maps,
- wherein the one or more feature maps are packed into a bitstream,
- wherein the one or more feature maps are extracted at any intermediate layer of an artificial neural network model and used for a machine analysis task of a decoder, and
- wherein the bitstream includes
  - data of a base layer, or
  - the data of the base layer and data of at least one enhancement layer,
  - wherein the data of the base layer relates to a first artificial neural network model and is used for a first machine task, and
  - wherein the data of the at least one enhancement layer relates to a second artificial neural network model and is used for a second machine task.

* * * * *